(12) United States Patent
Gupta et al.

(10) Patent No.: US 8,341,524 B2
(45) Date of Patent: Dec. 25, 2012

(54) PORTABLE ELECTRONIC DEVICE WITH LOCAL SEARCH CAPABILITIES

(75) Inventors: Sandeep Gupta, Fremont, CA (US); Szu-Wen Huang, Fremont, CA (US); Greg Marriott, Honolulu, HI (US); Jeff Lee, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1388 days.

(21) Appl. No.: 11/519,352

(22) Filed: Sep. 11, 2006

(65) Prior Publication Data

US 2008/0065988 A1    Mar. 13, 2008

(51) Int. Cl.
*G06F 7/00* (2006.01)
(52) U.S. Cl. ........................................................ 715/716
(58) Field of Classification Search .................. 345/156, 345/169, 172, 173, 184; 707/3; 725/62; 715/716
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,379,057 A | 1/1995 | Clough |
| 5,406,305 A | 4/1995 | Shimomura et al. |
| 5,559,945 A | 9/1996 | Beaudet et al. |
| 5,566,337 A | 10/1996 | Szymanski et al. |
| 5,583,993 A | 12/1996 | Foster et al. |
| 5,608,698 A | 3/1997 | Yamanoi et al. |
| 5,616,876 A | 4/1997 | Cluts |
| 5,617,386 A | 4/1997 | Choi |

(Continued)

FOREIGN PATENT DOCUMENTS

DE    43 34 773 A1    4/1994

(Continued)

OTHER PUBLICATIONS

"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.

(Continued)

*Primary Examiner* — Quan-Zhen Wang
*Assistant Examiner* — Tony Davis
(74) *Attorney, Agent, or Firm* — Schwegman Lundberg & Woessner, P.A.

(57) ABSTRACT

Improved methods and systems that assist a user in searching media items on a portable electronic device are disclosed. According to one aspect of the invention, a portable electronic device is provided with a search function that enables a user to search for media items resident on the portable electronic device. The search function can search through different types of media items. Those of the media items that are deemed matching can be ranked in order of relevance and displayed in a list for the user. Thereafter, the user can navigate the list to select one of the listed media items for playback. According to another aspect of the invention, various graphical user interfaces can be presented on a portable electronic device to assist a user in interacting with the portable electronic device to utilize a search function.

31 Claims, 12 Drawing Sheets

U.S. PATENT DOCUMENTS

| | | | |
|---|---|---|---|
| 5,670,985 A | 9/1997 | Cappels, Sr. et al. |
| 5,675,362 A | 10/1997 | Clough |
| 5,684,513 A | 11/1997 | Decker |
| 5,710,922 A | 1/1998 | Alley et al. |
| 5,712,949 A | 1/1998 | Kato et al. |
| 5,717,422 A | 2/1998 | Fergason |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |
| 5,761,519 A | 6/1998 | Wada et al. |
| 5,778,374 A | 7/1998 | Dang et al. |
| 5,798,921 A | 8/1998 | Johnson et al. |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 5,986,979 A | 11/1999 | Bickford et al. |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,031,797 A | 2/2000 | Van Ryzin et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,297,795 B1 | 10/2001 | Kato et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 | 9/2002 | Reinhardt et al. |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,607 B1 | 8/2003 | Davis et al. |
| 6,611,789 B1 | 8/2003 | Darley |
| 6,617,963 B1 | 9/2003 | Watters et al. |
| 6,621,768 B1 | 9/2003 | Keller et al. |
| 6,623,427 B2 | 9/2003 | Mandigo |
| 6,631,101 B1 | 10/2003 | Chan et al. |
| 6,693,612 B1 | 2/2004 | Matsumoto et al. |
| 6,707,768 B2 | 3/2004 | Schilling, Jr. et al. |
| 6,731,312 B2 | 5/2004 | Robbin |
| 6,760,536 B1 | 7/2004 | Amir et al. |
| 6,762,741 B2 | 7/2004 | Weindorf |
| 6,781,611 B1 | 8/2004 | Richard |
| 6,794,566 B2 | 9/2004 | Pachet |
| 6,799,226 B1 | 9/2004 | Robbin et al. |
| 6,801,964 B1 | 10/2004 | Mahdavi |
| 6,832,293 B1 | 12/2004 | Tagawa et al. |
| 6,832,373 B2 | 12/2004 | O'Neill |
| 6,844,511 B1 | 1/2005 | Hsu et al. |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,886,749 B2 | 5/2005 | Chiba et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,931,377 B1 | 8/2005 | Seya |
| 6,934,812 B1 | 8/2005 | Robbin et al. |
| 6,950,087 B2 | 9/2005 | Knox et al. |
| 7,010,365 B2 | 3/2006 | Maymudes |
| 7,028,096 B1 | 4/2006 | Lee |
| 7,046,230 B2 | 5/2006 | Zadesky |
| 7,062,225 B2 | 6/2006 | White |
| 7,070,349 B2 | 7/2006 | Dombrowski et al. |
| 7,076,561 B1* | 7/2006 | Rosenberg et al. ........... 709/231 |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,131,059 B2 | 10/2006 | Obrador |
| 7,143,241 B2 | 11/2006 | Hull |
| 7,146,437 B2 | 12/2006 | Robbin et al. |
| 7,171,331 B2 | 1/2007 | Vock et al. |
| 7,191,244 B2 | 3/2007 | Jennings et al. |
| 7,213,228 B2 | 5/2007 | Putterman et al. |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 | 4/2008 | Le et al. |
| 7,508,535 B2 | 3/2009 | Hart et al. |
| 7,536,565 B2 | 5/2009 | Girish et al. |
| 7,593,782 B2 | 9/2009 | Jobs et al. |
| 7,856,564 B2 | 12/2010 | Girish et al. |
| 7,865,745 B2 | 1/2011 | Girish et al. |
| 7,889,497 B2 | 2/2011 | Jobs et al. |
| 2001/0013983 A1 | 8/2001 | Izawa et al. |
| 2001/0029178 A1 | 10/2001 | Criss et al. |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0028683 A1 | 3/2002 | Banatre et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0059440 A1 | 5/2002 | Hudson et al. |
| 2002/0059499 A1 | 5/2002 | Hudson |
| 2002/0090912 A1 | 7/2002 | Cannon et al. |
| 2002/0116082 A1 | 8/2002 | Gudorf |
| 2002/0116517 A1 | 8/2002 | Hudson et al. |
| 2002/0122031 A1* | 9/2002 | Maglio et al. ................. 345/184 |
| 2002/0123359 A1 | 9/2002 | Wei et al. |
| 2002/0147728 A1* | 10/2002 | Goodman et al. ......... 707/104.1 |
| 2002/0152045 A1 | 10/2002 | Dowling et al. |
| 2002/0156833 A1 | 10/2002 | Maurya et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0002688 A1 | 1/2003 | Kanevsky et al. |
| 2003/0007001 A1 | 1/2003 | Zimmerman |
| 2003/0018799 A1* | 1/2003 | Eyal .............................. 709/231 |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |

| | | | |
|---|---|---|---|
| 2003/0095096 A1* | 5/2003 | Robbin et al. ............... 345/156 |
| 2003/0097379 A1 | 5/2003 | Ireton |
| 2003/0104835 A1 | 6/2003 | Douhet |
| 2003/0127307 A1 | 7/2003 | Liu et al. |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0182100 A1 | 9/2003 | Plastina et al. |
| 2003/0221541 A1 | 12/2003 | Platt |
| 2003/0229490 A1 | 12/2003 | Etter |
| 2003/0236695 A1 | 12/2003 | Litwin, Jr. |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0187670 A1 | 9/2004 | Sasaki |
| 2004/0198436 A1 | 10/2004 | Alden |
| 2004/0210628 A1 | 10/2004 | Inkinen et al. |
| 2004/0216108 A1 | 10/2004 | Robbin |
| 2004/0224638 A1 | 11/2004 | Fadell et al. |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0060542 A1 | 3/2005 | Risan et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0134578 A1* | 6/2005 | Chambers et al. ............ 345/184 |
| 2005/0146534 A1 | 7/2005 | Fong et al. |
| 2005/0149213 A1 | 7/2005 | Guzak et al. |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/0216855 A1 | 9/2005 | Kopra et al. |
| 2005/0218303 A1 | 10/2005 | Poplin |
| 2005/0234983 A1* | 10/2005 | Plastina et al. ............. 707/104.1 |
| 2005/0245839 A1 | 11/2005 | Stivoric et al. |
| 2005/0246324 A1* | 11/2005 | Paalasmaa et al. ............... 707/3 |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2005/0270276 A1* | 12/2005 | Sugimoto et al. ............ 345/173 |
| 2006/0010472 A1* | 1/2006 | Godeny ........................... 725/62 |
| 2006/0013414 A1 | 1/2006 | Shih |
| 2006/0025068 A1 | 2/2006 | Regan et al. |
| 2006/0026424 A1 | 2/2006 | Eto |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0088228 A1 | 4/2006 | Marriott et al. |
| 2006/0092122 A1 | 5/2006 | Yoshihara et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0190577 A1 | 8/2006 | Yamada |
| 2006/0190980 A1 | 8/2006 | Kikkoji et al. |
| 2006/0221057 A1* | 10/2006 | Fux et al. ...................... 345/169 |
| 2006/0221788 A1 | 10/2006 | Lindahl et al. |
| 2006/0253433 A1* | 11/2006 | Kim et al. ........................ 707/3 |
| 2006/0259758 A1 | 11/2006 | Deng et al. |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0080446 A1 | 4/2007 | Maloney et al. |
| 2007/0089057 A1 | 4/2007 | Kindig |
| 2007/0106660 A1* | 5/2007 | Stern et al. ........................ 707/5 |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |
| 2010/0077338 A1 | 3/2010 | Matthews et al. |
| 2011/0090645 A1 | 4/2011 | Jobs et al. |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1 289 197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| GB | 2399639 | 5/2005 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-067794 | 3/2001 |
| JP | 2001-236286 | 8/2001 |
| JP | 2001-312338 | 11/2001 |
| JP | 2002-42425 | 2/2002 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 20010076508 | 8/2001 |
| WO | WO 01/33569 | 6/1995 |
| WO | WO 95/16950 | 6/1995 |
| WO | 98/17032 | 4/1998 |
| WO | WO 99/28813 | 6/1999 |
| WO | WO 00/22820 | 4/2000 |

| | | |
|---|---|---|
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/036957 | 5/2003 |
| WO | WO 03/067202 | 8/2003 |
| WO | WO 03/079360 | 9/2003 |
| WO | WO 03/085670 | 10/2003 |
| WO | 2004/061850 A1 | 7/2004 |
| WO | WO 2004/055637 | 7/2004 |
| WO | WO 2004/057475 | 7/2004 |
| WO | WO 2004/061850 | 7/2004 |
| WO | WO2004/084413 A2 | 9/2004 |
| WO | WO 2004/098079 | 11/2004 |
| WO | WO 2004/104815 | 12/2004 |
| WO | WO 2005/031737 | 4/2005 |
| WO | 05/048644 | 5/2005 |
| WO | WO 2005/008505 | 7/2005 |
| WO | 2005/109781 | 11/2005 |
| WO | WO 2006/040737 | 4/2006 |
| WO | 2006/071364 | 6/2006 |
| WO | WO 2007/013860 | 2/2007 |

OTHER PUBLICATIONS

International Search Report dated Jul. 7, 2008 in PCT Application No. PCT/US2007/076793.
International Search Report dated Jun. 10, 2008 in PCT Application No. PCT/US2007/010630.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Jun. 17, 2008 in U.S. Appl. No. 11/212,313.
Office Action dated May 30, 2008 in Chinese Patent Application No. 02825938.6.
Office Action dated Oct. 16, 2008 in U.S. Appl. No. 11/327,544.
Office Action in Japanese Patent Application No. 2008-045351 dated Aug. 5, 2008.
Office Action in U.S. Appl. No. 11/212,555 dated Aug. 14, 2008.
Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association For Computing Machinery, Conference Proceedings, Apr. 5, 2003.
Apple iTunes Smart Playlists, downloaded Apr. 5, 2005 from http://web.archive.org/web/20031002011316/www.apple.com/itunes/smartplaylists . . . pp. 1-2.
International Search Report dated Dec. 5, 2007 in PCT Application No. PCT/US2007/004810.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia: The Free Encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in PCT Application No. PCT/US2007/004810.
Written Opinion dated Dec. 5, 2007 in PCT Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy. "How to Do Everything With Your iPod and iPod Mini", 2004, McGraw-Hill Professional, p. 33.
Office Action dated Feb. 4, 2008 in U.S. Appl. No. 11/566,072.
"Apple Announces iTunes 2," Press Release, Apple Computer, Inc., Oct. 23, 2001.
"Apple Introduces iTunes / World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0" / MP3 Player and Encoder for Macintosh by Jeffrey Robbin, Bill Kincaid and Dave Heller, manual by Tom Negrino, published by Casady & Greene, Inc., 2000.
"12.1" 925 Candela Mobile PC, downloaded from LCDHardware.com on Dec. 19, 2002, http://www.lcdharware.com/panel/12_1_panel/default.asp.
"BL82 Series Backlit Keyboards", Dec. 19, 2002. www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi/Media Reporting and Convergence, 2 pgs.
"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly/Optical Fiber Optic Membrane Switch Backlighting", downloaded Dec. 19, 2002, http://www.poly/optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1 &z . . . .
"TAOS Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.

Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1/2.
Andrew Birrell, "Personal Jukebox (PJB)," Oct. 13, 2000, http://birrell.org/andrew/talks/pjb/overview.ppt.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb/.
CREATIVE: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
CREATIVE: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
CREATIVE: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
De Herrera, Chris, "Microsoft ActiveSync 3.1," Version 1.02, Oct. 13, 2000.
iAP Sports Lingo 0x09 Protocol V1.00, May 1, 2006.
IEEE 1394—Wikipedia, 1995, http://www.wikipedia.org/wiki/Firewire.
Written Opinion of the International Searching Authority dated Nov. 24, 2006 in PCT Application No. PCT/US2005/046797.
International Search Report dated Feb. 4, 2003 in corresponding application No. PCT/US2002/033330.
International Search Report dated Jul. 10, 2007 in corresponding application No. PCT/US2006/048738.
International Search Report dated Apr. 5, 2006 from corresponding International Application No. PCT/US2005/038819.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report in corresponding European Application No. 06256215.2 dated Feb. 20, 2007.
Invitation to Pay Additional Fees and Partial Search Report for corresponding PCT Application No. PCT/US2005/046797 dated Jul. 3, 2006.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Jabra Bluetooth Headset User Manual; GN Netcom A/S, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Nonhoff/Arps, et al., "Straßenmusik Portable MP3/Spieler mit USB/Anschluss," CT Magazin Fuer Computer Technik, Verlag Heinz Heise GMBH, Hannover DE, No. 25, Dec. 4, 2000.
International Search Report dated Nov. 24, 2006 in PCT Application No. PCT/US2005/046797.
Personal Jukebox (PJB), "Systems Research Center and PAAD," Compaq Computer Corp., Oct. 13, 2000, http://research.compaq.com/SRC/pjb/.

Peter Lewis, "Two New Ways to Buy Your Bits," CNN Money, Dec. 31, 2003, pp. 1/4.
Sastry, Ravindra Wadali. "A Need for Speed: A New Speedometer for Runners", submitted to the Department of Electrical Engineering and Computer Science at the Massachusetts Institute of Technology, May 28, 1999.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "Low/decibel earbuds keep noise at a reasonable level", The Telegraph Online, dated Aug. 13, 2006, http://www.nashuatelegraph.com/apps/pbcs.dll/article?Date=20060813&Cate . . . Downloaded Aug. 16, 2006.
Steinberg, "Sonicblue Rio Car," Product Review, Dec. 12, 2000, http://electronics.cnet.com/electronics/0/6342420/1304/4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
U.S. Appl. No. 11/621,541, "Personalized Podcasting Podmapping" filed Jan. 9, 2007.
Waterproof Music Player with FM Radio and Pedometer User Manual, Oregon Scientific, 2005.
"Creative liefert erstes Portable Media Center aus" [Online] Sep. 2, 2004, Retrieved from the internet on Sep. 20, 2007 from http://www.golem.de/0409/33347.html>.
International Search Report dated Feb. 18, 2008 in Patent Application No. PCT/US2007/079766.
International Search Report Dated Sep. 27, 2007 in Application No. 05824296.7.
Office Action dated Apr. 4, 2008 in U.S. Appl. No. 11/212,555.
Office Action dated Feb. 20, 2008 in Japanese Application No. 2007-538196.
Office Action dated Feb. 25, 2008 in U.S. Appl. No. 11/749,599.
Office Action dated Mar. 4, 2008 from U.S. Appl. No. 10/973,657.
Partial International Search Report dated Feb. 1, 2008 in Patent Application No. PCT/US2007/010630.
Written Opinion dated Feb. 18, 2008 in Patent Application No. PCT/US2007/079766.
Search Report dated Mar. 20, 2008 in Patent Application No. PCT/US2007/077789.
Written Opinion dated Mar. 20, 2008 in Patent Application No. PCT/US2007/077789.
Invitation to Pay Additional Fees and Partial Search Report for PCT Application No. PCT/US2007/077160 dated Apr. 1, 2008.
"Combination Belt Clip Leaf Spring and Housing Latch", Wandt et al.; Motorola Technical Developments, Motorla Inc. Schaumburg, IL. vol. 18, Mar. 1, 1993.
Notification of Reason for Rejection from PCT Application No. 2003-539048 dated Nov. 27, 2007.
Office Action dated May 27, 2009 in U.S. Appl. No. 11/439,613.
Office Action dated Jun. 2, 2009 in U.S. Appl. No. 11/530,773.
Office Action dated May 11, 2009 in U.S. Appl. No. 11/680,580.
Notice of Allowance dated Apr. 21, 2009 in U.S. Appl. No. 11/327,544.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Written Opinion dated Oct. 10, 2008 in PCT Application No. PCT/US2007/077160.
Office Action dated Jan. 26, 2009 in U.S. Appl. No. 11/373,468.
Office Action dated Sep. 1, 2008 in EP Application No. 06 256 215.2.
Written Opinion dated Jan. 6, 2009, in Singapore Application No. 200701865-8.

Office Action dated Mar. 30, 2009 in U.S. Appl. No. 11/515,270.
Office Action dated Apr. 9, 2009 in U.S. Appl. No. 11/583,199.
Notice of Allowance dated Jun. 15, 2009 in U.S. Appl. No. 11/212,313.
Office Action dated Jun. 24, 2009 in U.S. Appl. No. 11/373,468.
Office Action dated Jun. 22, 2009 in U.S. Appl. No. 11/515,270.
Office Action dated Mar. 24, 2010 in U.S. Appl. No. 11/583,199.
Office Action dated Mar. 25, 2010 in U.S. Appl. No. 11/297,032.
Office Action dated Mar. 10, 2010 in U.S. Appl. No. 11/583,327.
Office Action dated Mar. 11, 2010 in U.S. Appl. No. 11/830,746.
Office Action dated Mar. 4, 2010 in U.S. Appl. No. 11/324,863.
Office Action dated Sep. 10, 2009 in U.S. Appl. No. 11/746,548.
Office Action dated Dec. 16, 2009 in U.S. Appl. No. 11/746,548.
Office Action dated Sep. 3, 2009 in U.S. Appl. No. 11/324,863.
Office Action dated Sep. 2, 2009 in U.S. Appl. No. 11/515,270.
Office Action dated Nov. 16, 2009 in U.S. Appl. No. 11/439,613.
Office Action dated Feb. 3, 2010 in U.S. Appl. No. 11/439,613.
Office Action dated Dec. 14, 2009 in U.S. Appl. No. 11/535,646.
Office Action dated Oct. 16, 2009 in U.S. Appl. No. 11/583,199.
Office Action dated Oct. 23, 2009 in Chinese Application No. 200580048143.9.
Office Action dated Nov. 16, 2009 in U.S. Appl. No. 11/144,541.
Office Action dated May 29, 2009 in EP Application No. 06 847 856.9.
Examination Report dated Sep. 1, 2009 in Singapore Application No. 200701865-8.
Office Action dated Sep. 25, 2009 in Chinese Application No. 200610130904.1.
Notice of Allowance dated Feb. 4, 2010 in U.S. Appl. No. 11/535,646.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.
Office Action dated Jan. 17, 2011 from Japanese Application No. 2007-550394.
Tazawa et al., "The new form of music. How to enjoy MP3. Portable MP3 player of World minimum and extreme light weight", Hello! PC, Japan, Softbank Publishing Corp., Jun. 8, 1999, vol. 6, No. 9, pp. 208.
Extended European Search Report in EP Application No. 10177294.5, mailed Apr. 11, 2011.
Extended European Search Report in EP Application No. 10177433.9 mailed Mar. 4, 2011.
Extended European Search Report in EP Application No. 10177301.8 mailed Mar. 4, 2011.
Anonymous: "Creative MuVo player" Internet Citation, Dec. 31, 2002, XP002619387T3 Reviews, Retrieved from the Internet: URL: http://web.archieve.org/web/20030901203710/www.t3.co.uk/reviews/default.asp?pagetypeid=2&articleid=14853&subsectionid=756&subsubsectionid=647>. retrieved Jan. 21, 2011.
Anonymous: "Portable Media Player Field Guide," Internet Citation, Mar. 4, 2008, XP002619412, Creative Labs, Retrieved from the Internet: URL: http://connect.creativelabs.com/developer/PortableDevices/PortableMediaPlayerFieldGuidev9.pdf, retrieved on Jan. 25, 2011, pp. 8-10.
Anonymous: "Creative NOMAD MuVo Quick Start," Internet Citation, Dec. 31, 2004, XP002619377, CREATIVE, retrieved from the Internet: URL: http://files2.europe.creative.com/manualdn/Manuals/TSD/8476/0xE9B796DE/Creative%20MuVo%20Nordic%20Quick%20Start.pdf, retrieved on Jan. 25, 2011.

* cited by examiner

PORTABLE ELECTRONIC DEVICE WITH LOCAL SEARCH CAPABILITIES

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

Today, media playback devices, such as media players or music players, have storage capacity to store large collections of media, such as music. With such large media collections, in order for a user to select a particular song to be played by the media player, the user typically navigates through a long list of songs. As an example, the user could interact with the media player to display a list of artists that have songs that are stored within the media collection on the media player. The user then scrolls through the list and selects an appropriate song to be played. Unfortunately, however, as the storage capacity of media players increases, the number of songs stored in a media collection on a media player increases. Consequently, the list through which users must navigate in order to select a song can be extensive. One conventional approach to assisting users in traversing large collections of music is to provide acceleration with respect to the user input. For example, U.S. Patent Publication No. 2003/0076301 A1 describes one approach in which a user is able to scroll through lists of songs in an accelerated manner. The degree of acceleration can be based on the speed of a rotational user input. While acceleration is very helpful, in some cases, users can have difficulty or frustration locating the specific song of interest even when acceleration has been applied. Recently, media players have become capable of storing and playing back various different types of media items. The storage of various different types of media items makes locating of a specific media item even more complicated.

Besides navigating and traversing lists to locate media items of interest, another way to locate media items of interest is to search for media items that have a particular character string (e.g., word). For example, an online media store or a desktop media management application can enable a user to search available media content. Unfortunately, however, portable media playback devices have conventionally relied on navigation and traversal of lists and thus have not provided search capabilities.

Thus, there remains a need for further approaches to assist a user in locating media items of interest.

SUMMARY OF THE INVENTION

The invention pertains to improved methods and systems that assist a user in searching media items on a portable electronic device. According to one aspect of the invention, a portable electronic device is provided with a search function that enables a user to search for media items resident on a portable electronic device. The search function can search through different types of media items. Those of the media items that are deemed matching can be ranked in order of relevance and displayed in a list for the user. Thereafter, the user can navigate the list to select one of the listed media items for playback. According to another aspect of the invention, various graphical user interfaces can be presented on a portable electronic device to assist a user in interacting with the portable electronic device to utilize a search function.

The invention can be implemented in numerous ways, including as a method, system, device, apparatus (including graphical user interface), or computer readable medium. Several embodiments of the invention are discussed below.

As a method for searching media items stored on a portable electronic device having a display, a media storage device and a user input device, one embodiment of the invention includes at least the acts of: receiving search criteria from the user input device; searching media items stored in the media storage device to identify those of the media items that match the search criteria; and displaying at least a subset of those of the identified media items that match the search criteria.

As a method for searching media items stored on a portable electronic device having a display, a media storage and a user input device, another embodiment of the invention includes at least the acts of: displaying a search screen on the display; receiving at least one search character input for at least a portion of a search term from the user input device; searching for one or more media items stored in the media storage that match the one or more search characters; ranking the one or more matching media items; and displaying, in accordance with the ranking, at least a subset of those of the matching media items As a computer readable medium including at least computer program code for searching digital data stored on a portable electronic device, where the portable electronic device has a display, a data storage device and a user input device, one embodiment of the invention includes at least: computer program code for receiving search criteria from the user input device; computer program code for searching digital data items stored in the data storage device to identify those of the digital data items that match the search criteria; and computer program code for displaying at least a subset of those of the identified digital data items that match the search criteria.

As a media playback device, one embodiment of the invention includes at least: a display device; a user input device; at least one memory device capable of storing a plurality of media items and computer program code for displaying, navigating, playing or searching the plurality of media items; and a processing device. The processing device is capable of executing the computer program code for displaying, navigating, playing or searching the plurality of media items. The computer program code for displaying, navigating, playing or searching the plurality of media items includes at least: computer program code for receiving at least one search character input for at least a portion of a search term from the user input device; computer program code for searching for one or more media items stored in the media storage that match the one or more search characters; computer program code for ranking the one or more matching media items; and computer program code for displaying at least a subset of those of the matching media items on the display device in accordance with the ranking.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF THE INVENTION

The invention pertains to improved methods and systems that assist a user in searching media items on a portable electronic device. According to one aspect of the invention, a portable electronic device is provided with a search function that enables a user to search for media items resident on a portable electronic device. The search function can search through different types of media items. Those of the media items that are deemed matching can be ranked in order of relevance and displayed in a list for the user. Thereafter, the user can navigate the list to select one of the listed media items for playback. According to another aspect of the invention, various graphical user interfaces can be presented on a portable electronic device to assist a user in interacting with the portable electronic device to utilize a search function.

Other aspects and features of the invention will become apparent below. The improved methods and systems are particularly well-suited for use with a portable electronic device, such as a portable media playback device (e.g., portable media player).

"Media item," as used herein, is digital data that pertains to at least one of audio, video, and images. Some examples of specific forms of media items include, but are not limited to, songs, albums, audiobooks, playlists, movies, music videos, photos, computer games, podcasts, audio and/or video presentations, news reports, and sports updates. Media items can also be described or characterized. For example, metadata can be provided for some or all of the media items to describe or characterize the corresponding media items. The metadata can, for example, provide information pertaining to one or more of: title, name, artist, album, genre, duration, lyrics, format, bit rate, sample rate, encoding, release data, composer, year, season, episode, etc.

Embodiments of the invention are discussed below with reference to FIGS. 1A-8G. However, those skilled in the art will readily appreciate that the detailed description given herein with respect to these figures is for explanatory purposes as the invention extends beyond these limited embodiments.

According to one aspect of the invention, a search function can be performed on a portable electronic device. The search function can enable a user of the portable media device to locate media items resident on the portable media device. A portable media device is battery-powered, lightweight and easily transported.

Figure 1A:
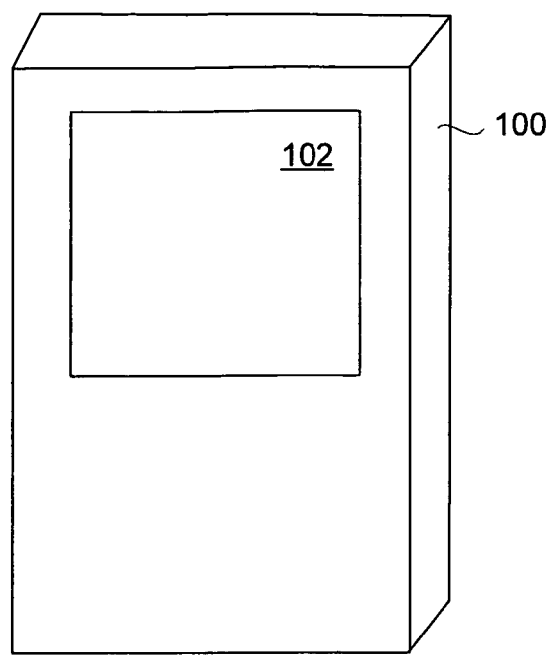
FIG. 1A is a diagram of a portable electronic device according to one embodiment of the invention.

FIG. 1A is a diagram of a portable electronic device 100 according to one embodiment of the invention. The portable electronic device 100 is capable of performing a search function. The portable electronic device 100 includes a housing having a display device 102 and one or more user input devices (not shown) on a front, side, and/or back surface of the housing. The user input devices can, for example, include one or more buttons, dials, touch-sensitive surfaces, keypads, switches, etc. A voice recognition system is another type of user input device that can be used to provide user input. The one or more user input devices enable a user of the portable electronic device 100 to provide user inputs to the portable electronic device 100. For example, the user input devices can enable the user to input search terms for use with the search function. The display device 102 provides an output device on which search results can be displayed for the user. Additionally, internal to the housing of the portable electronic device are various software or electrical components in support of the search function and other functions as further discussed in FIGS. 2 and 3 below.

Figure 1B:
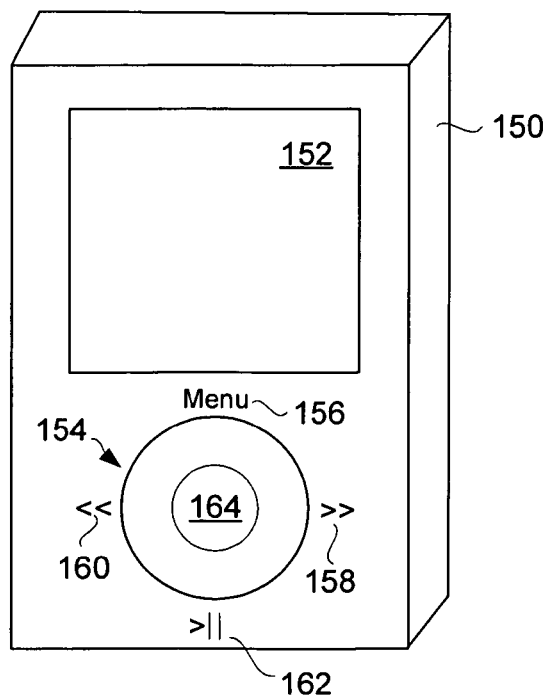
FIG. 1B is a diagram of a portable media player according to another embodiment of the invention.

FIG. 1B is a diagram of a portable media player 150 according to another embodiment of the invention. The portable electronic device 150 can, for example, represent one implementation of the portable media player 100. The portable electronic device 150 is capable of performing a search function. The portable media player 150 includes a housing having a display device 152 and a rotational user input device 154. In this embodiment, the rotational user input device 154 is provided on a front surface of the housing. The rotational user input device 154 receives at least rotational user inputs from a user of the portable media player 150 to interact with menus, lists, etc. being displayed on the display device 152. The portable media player 150 can also support button-actions. As illustrated in FIG. 1B, the housing of the portable media player 150 includes button-action regions 156-162. The button-action regions 156-162 can be separate from or integrated with the rotational user input device 154. The user of the portable media player 150 can press proximate to the button-action regions 156-162 to signal the portable media player 150 as to a particular user input. The button-action regions 156-162 can provide button-like functions. As an example, the button-action regions 156-162 can respectively correspond to common media player functions of Menu, Next, Back, and End. The housing of the portable media player 150 can also include a select button region 164. In the embodiment illustrated in FIG. 1B, the select button region 164 is provided at the center of the rotational user input device 154. However, in other embodiments, the select button region 164 can be provided at other locations on the housing of the portable media player 150. These button regions 156-164 can be associated with a touch sensitive surface on the housing of the portable media player 150 or with separate switching mechanisms provided proximate to the button regions 156-164. With respect to performing the search function, the rotational user input device 154, together with the button regions 156-164, can enable the user to input search terms for use with the search function as well as to navigate through results lists provided by the search function. Additionally, internal to the housing of the portable electronic device are various software or electrical components in support of the search function and other functions as further discussed in FIGS. 2 and 3 below.

Additional details on touch sensitive surfaces for portable media players are provided in: (1) U.S. Pat. No. 7,046,230 B2 and is hereby incorporated by reference herein, (2), U.S.

patent application Ser. No. 10/722,948, filed Nov. 25, 2003 and entitled "TOUCH PAD FOR HANDHELD DEVICE," which is hereby incorporated by reference herein, and (3) U.S. patent application Ser. No. 10/188,182, filed Jul. 1, 2002 and entitled "TOUCH PAD FOR HANDHELD DEVICE," which is hereby incorporated by reference herein.

Figure 2:
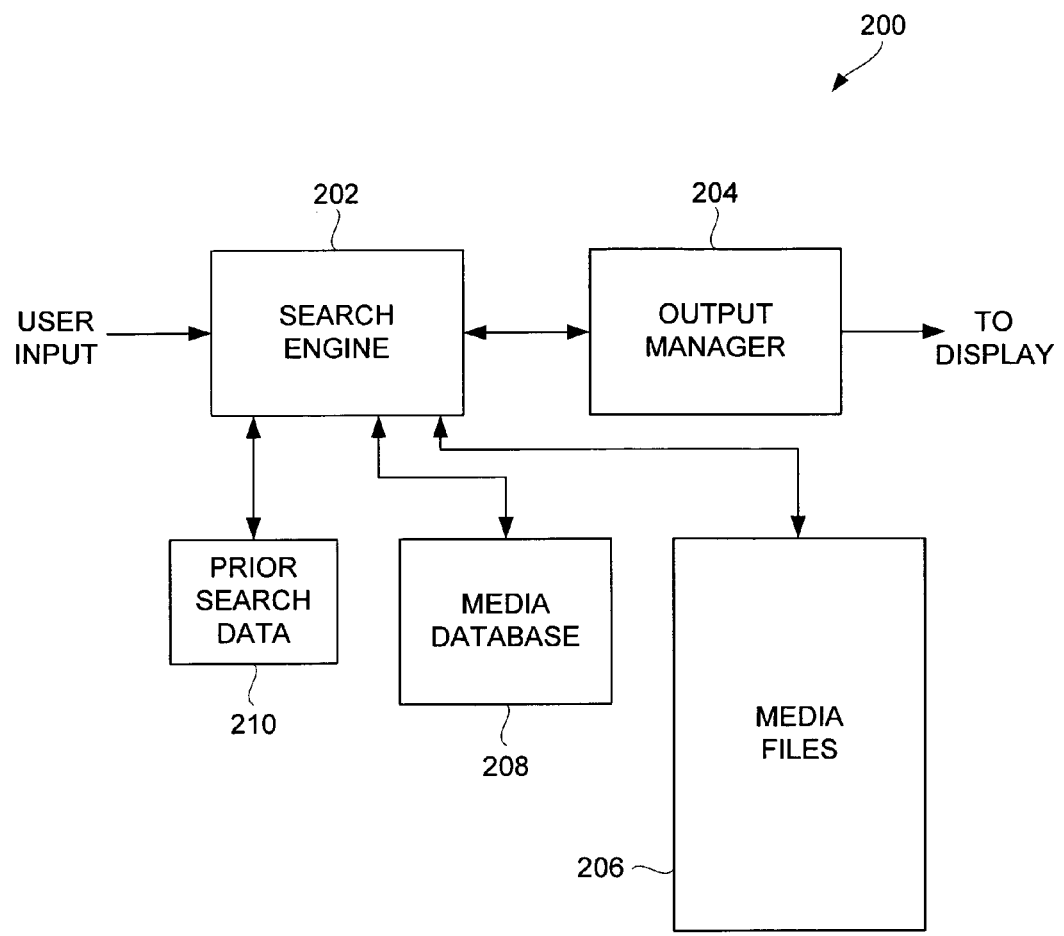
FIG. 2 is a block diagram of a portable search system according to one embodiment of the invention.

FIG. 2 is a block diagram of a portable search system 200 according to one embodiment of the invention. The portable search system 200 is, for example, implemented by a portable electronic device, such as the portable electronic device 100 illustrated in FIG. 1A or the portable media player 150 illustrated in FIG. 1B.

The portable search system 200 includes a search engine 202 and an output manager 204. The search system 202 receives a user input. The user input can provide one or more search characters to the search engine 202. These one or more search characters can be used to form a search term. The search term can then be executed by the search engine 202 to determine whether there are any matching media items stored locally at the portable electronic device. In this regard, the portable electronic device stores a plurality of media files 206. These media files 206 are typically stored in a mass storage device provided within the portable electronic device. Examples of the mass storage device include Flash memory or a disc drive. Additionally, the portable electronic device can include a media database 208. The media database 208 stores characteristics (e.g., metadata) associated with each of the media items stored within the media files 206. Hence, when the search engine 202 executes a search in accordance with the search term, the search engine 202 interacts with the media database 208 to identify those media items stored within the media files 206 that match the search term. The search engine 202 could also interact with the media files 206 but such access would be substantially slower. The matching media items are thus identified by the search engine 202. The identified matching media items are then able to be displayed by an output manager 204 on a display device. Here, the output manager 204 causes a representation of at least a plurality of the matching media items to be displayed on a display device. For example, the representations being displayed can be the title or name of the track, album or artist that is associated with the matching media items.

In addition, the portable search system 200 can store prior search data 210. The prior search data 210 includes data concerning one or more prior searches that have been previously performed by the search engine 202. The search engine 202 can potentially utilize the prior search data 210 to perform subsequent searches. Advantageously, the search engine 210 is able to operate more quickly and more efficiently when the prior search data 210 is available for its use.

Figure 3:
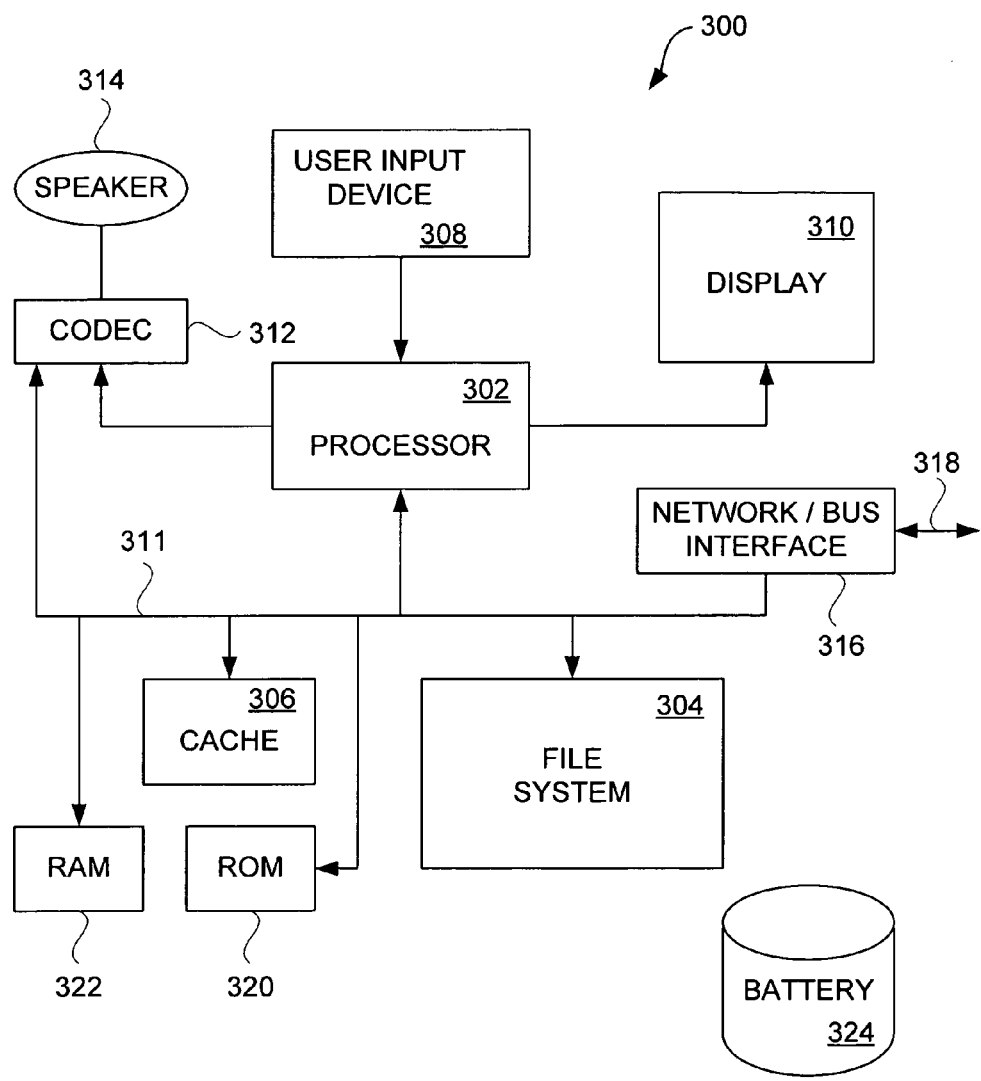
FIG. 3 is a block diagram of a media player suitable for use with the invention.

FIG. 3 is a block diagram of a media player 300 suitable for use with the invention. The media player 300 illustrates circuitry of a representative portable media device. Hence, the circuitry of the media player 300 can be representative of the circuitry within the portable electronic device 100 illustrated in FIG. 1A or the portable media player 150 illustrated in FIG. 1B.

The media player 300 includes a processor 302 that pertains to a microprocessor or controller for controlling the overall operation of the media player 300. The media player 300 stores media data pertaining to media items in a file system 304 and a cache 306. The file system 304 is, typically, semiconductor memory (e.g., Flash memory) or one or more storage disks. The file system 304 typically provides high capacity storage capability for the media player 300. However, since the access time to the file system 304 can be relatively slow, the media player 300 can also include the cache 306. The cache 306 is, for example, Random-Access Memory (RAM) provided by semiconductor memory. The relative access time to the cache 306 is typically shorter than for the file system 304. However, the cache 306 does not have the large storage capacity of the file system 304. Further, the file system 304, when active, consumes more power than does the cache 306. The power consumption is often a concern when the media player 300 is a portable media player that is powered by a battery 324. The media player 300 also includes a RAM 320 and a Read-Only Memory (ROM) 322. The ROM 322 can store programs, utilities or processes to be executed in a non-volatile manner. The RAM 320 provides volatile data storage, such as for the cache 306.

The media player 300 also includes a user input device 308 that allows a user of the media player 300 to interact with the media player 300. For example, the user input device 308 can take a variety of forms, such as a button, keypad, dial, touch-sensitive surface, etc. Still further, the media player 300 includes a display 310 (screen display) that can be controlled by the processor 302 to display information to the user. A data bus 311 can facilitate data transfer between at least the file system 304, the cache 306, the processor 302, and the CODEC 312.

In one embodiment, the media player 300 serves to store a plurality of media items (e.g., songs, videos, podcasts, etc.) in the file system 304. When a user desires to have the media player play a particular media item, a list of available media items is displayed on the display 310. Typically, the list can be arrived at through either menu navigation or a search process. Then, using the user input device 308, a user can select one of the available media items. The processor 302, upon receiving a selection of a particular media item, supplies the media data to one or more appropriate output devices. As an example, for audio output, the processor 302 can supply the media data (e.g., audio file) for the particular media item to a coder/decoder (CODEC) 312. The CODEC 312 can then produce analog output signals for a speaker 314. The speaker 314 can be a speaker internal to the media player 300 or external to the media player 300. For example, headphones or earphones that connect to the media player 300 would be considered an external speaker.

The media player 300 also includes a network/bus interface 316 that couples to a data link 318. The data link 318 allows the media player 300 to couple to another device (e.g., a host computer, a power source, or an accessory device). The data link 318 can be provided over a wired connection or a wireless connection. In the case of a wireless connection, the network/bus interface 316 can include a wireless transceiver. The data link 318 can also provide power to the media player 300 (e.g., to charge the battery 324).

Figure 4:
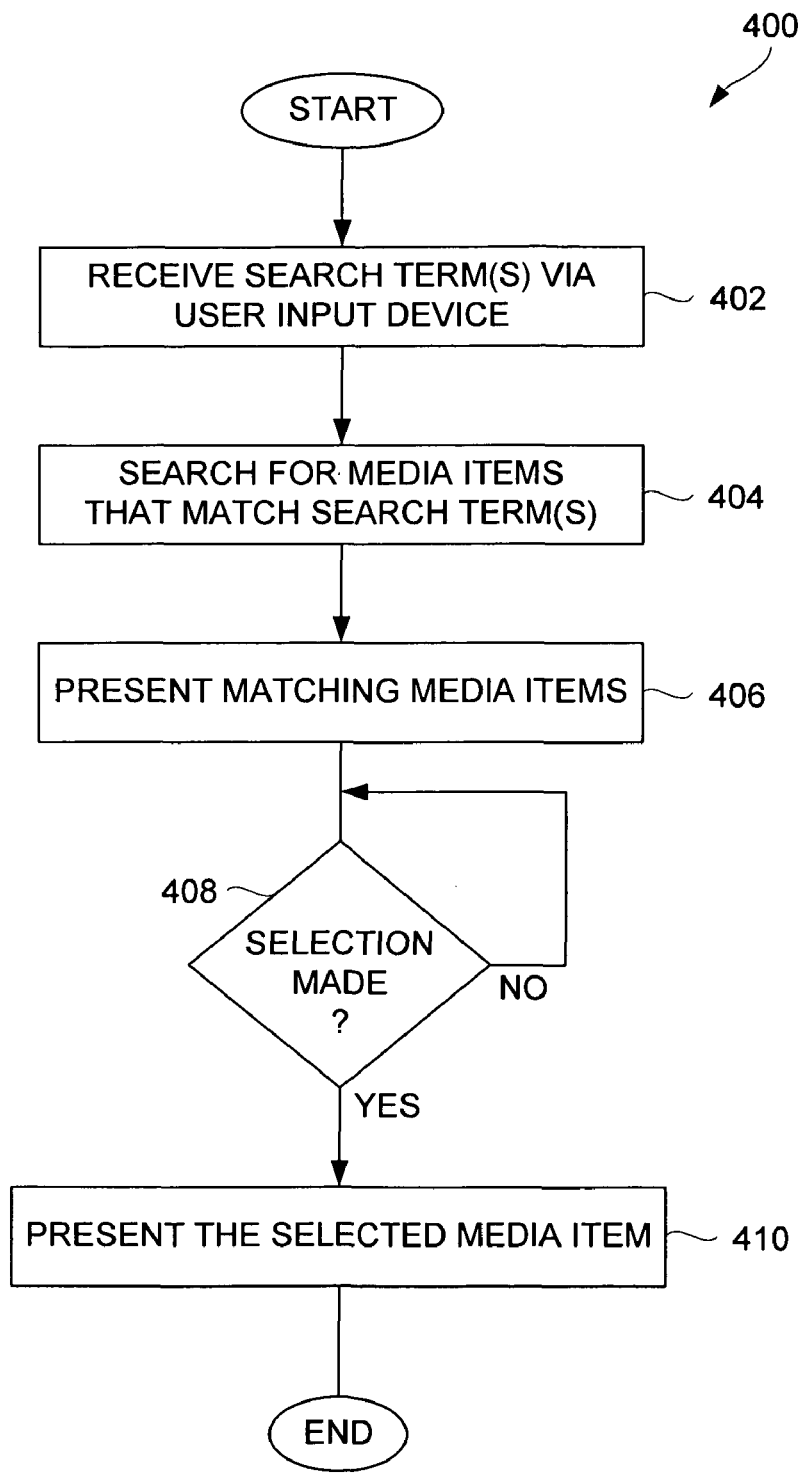
FIG. 4 is a flow diagram of a local search process according to one embodiment of the invention.

FIG. 4 is a flow diagram of a local search process 400 according to one embodiment of the invention. The local search process 400 is, for example, performed by a portable electronic device, such as the portable electronic device 100 illustrated in FIG. 1A or the portable media player 150 illustrated in FIG. 1B.

The local search process 400 initially receives one or more search terms via a user input device associated with the portable electronic device. In general, a search term can be considered a "character string" including one or more characters. After (or as) the one or more search terms are received 402, media items resident on the portable electronic device are searched 404 to identify those that match the one or more search terms. In one implementation, the characteristics (e.g., metadata) of the media items are stored within a database (e.g., media database 208) in a memory device internal to the portable electronic device. By searching the characteristics of the media items within the database, the media items that match the search terms can be identified. Next, the matching media items are presented 406. In one implementation, the matching media items can be presented 406 by displaying them on a display device associated with the portable electronic device. In another implementation, the matching media items can be presented 406 by audio output.

After the matching media items have been presented 406, a decision 408 determines whether a selection has been made. The user can, for example, make a selection of at least one of the matching media items through use of the user input device. When the decision 408 determines that a user selection has not been made, the local search process 400 can await such a selection. While awaiting such a selection, the portable electronic device is available to perform a variety of other processing tasks, including further modifying the one or more search terms being utilized. In any case, once the decision 408 determines that a selection has been made, the selected media item is presented 410. In one implementation, the selected media item can be presented 410 on the display device associated with the portable electronic device. In another implementation, the selected media item can be presented 410 by playing back the selected media item to generate audio output signals from the portable electronic device. The audio output signals can be supplied to a speaker associated with the portable electronic device or a headset associated with the portable electronic device. The speaker or headset can be coupled to the portable electronic device in a wired (e.g., wire(s) or cable) or wireless manner (e.g., Bluetooth). Following the block 410, the local search process 400 is complete and ends.

Figure 5A:
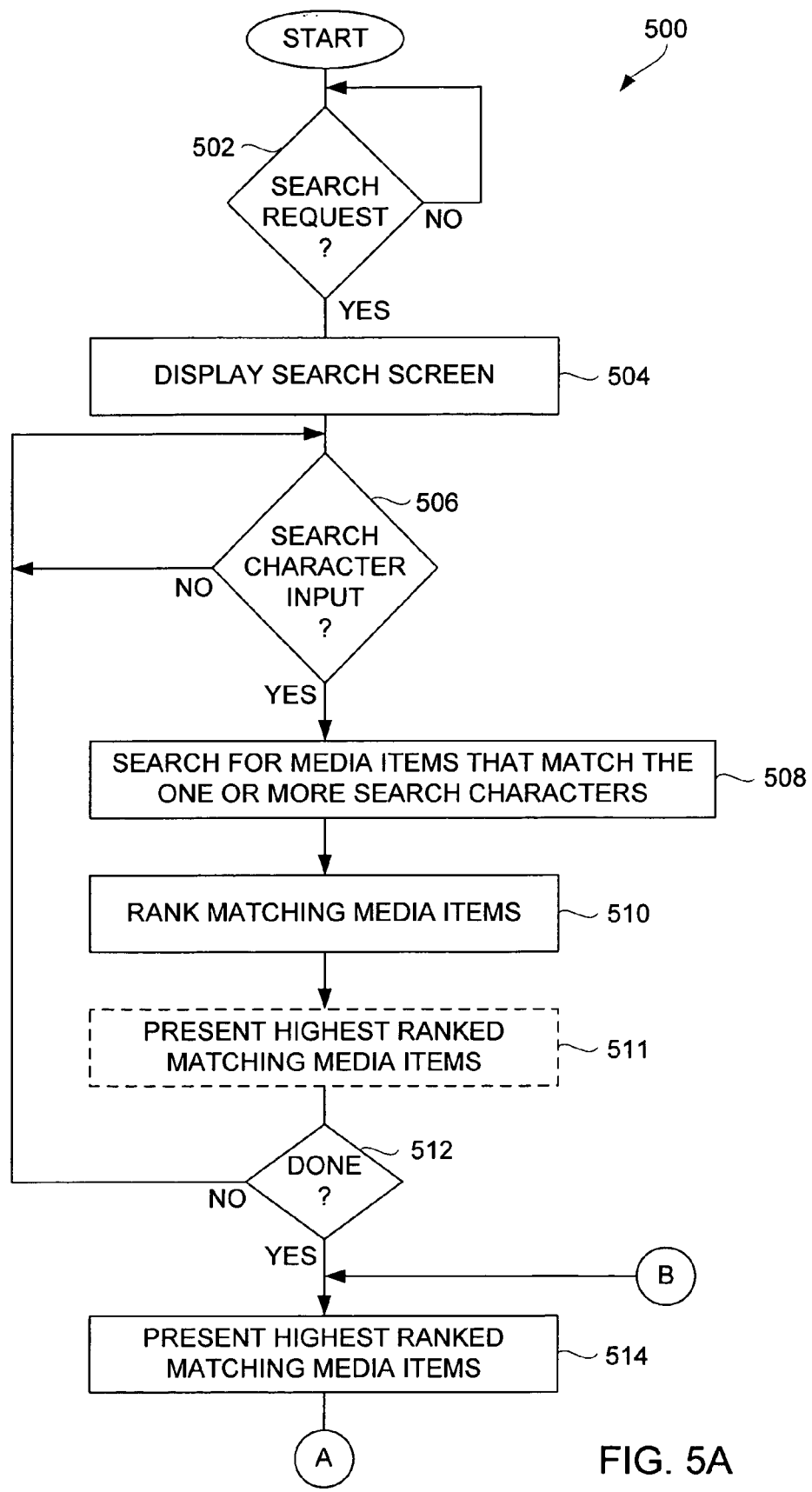
FIGS. 5A-5B are flow diagrams of a local search process according to another embodiment of the invention.
Figure 5B:
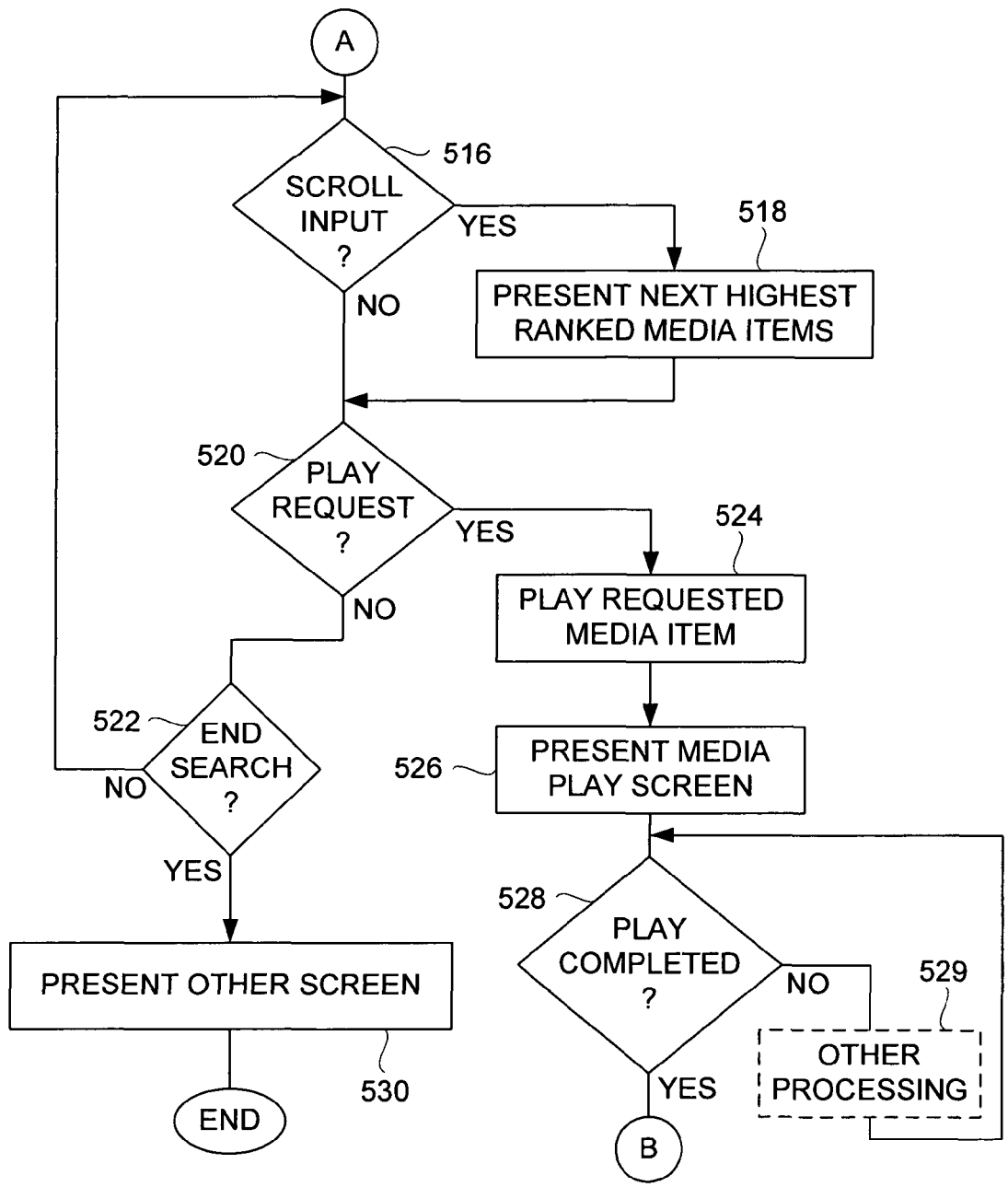

FIGS. 5A-5B are flow diagrams of a local search process 500 according to another embodiment of the invention. The local search process 500 is, for example, performed by a portable electronic device, such as the portable electronic device 100 illustrated in FIG. 1A or a portable media player 150 illustrated in FIG. 1B.

The local search process 500 begins with a decision 502 that determines whether a search request has been received. When the decision 502 determines that a search request has not been received, the local search process 500 awaits such a request. Once the decision 502 determines that a search request has been received, a search screen is displayed 504. Next, a decision 506 determines whether a search character has been input. In one implementation, the search character is one of A-Z, 0-9, or a space. A user can also input a symbol for backspace or done. When the decision 506 determines that a search character has not been input, the local search process 500 awaits input of a search character. Alternatively, when the decision 506 determines that a search character has been input, stored media items are searched 508 to identify those media items that match the one or more search characters that have been input. In one implementation, the search include additional matches be ignore punctuation (e.g., "-"). Also, if the metadata of media items includes non-English characters, an English character can be used in its place when searching for matches. A table of character mappings from non-English to English can be provided to the extent a reasonable equivalent is available (e.g., "ë" can be replaced with "e"). These character mappings can also include a diphthongs (e.g., "æ" can be replaced with "ae". The stored media items being searched are resident in (i.e., stored in) the portable electronic device. The matching media items are then ranked 510. The manner by which the matching media items are ranked can vary depending on implementation. Additional information on one approach to ranking media items is discussed below.

Optionally, after the matching media items are ranked, the highest ranked matching media items can be presented 511. Such optional presentation 511 can provide dynamic feedback to the user as to the effectiveness of the search terms. In one embodiment, a search in process can have its search results dynamically updated on the display (e.g., presentation 511). However, if another character for the search term is entered while a search is being processed, the ongoing search can be interrupted and the new search started. In this manner, better user responsiveness results.

Next, a decision 512 determines whether the search process is done. When the decision 512 determines that the search process is not done, the local search process 500 returns to repeat the decision 506 and subsequent blocks, so that the search process can continue to refine the search characters to be utilized in the search. On the other hand, when the decision 512 determines that the search process is done, the highest ranked matching media items are presented 514. In the event that the presentation 511 is provided, the presentation 514 may not be required if the presentation 511 remains displayed and the presentation 514 is the same as the presentation 511. In one embodiment, however, the highest ranked matching media items can be presented 514 using a search results screen which is displayed on a display device of the portable electronic device.

Next, a decision 516 determines whether a scroll input has been received. When the decision 516 determines that a scroll input has been received, the next highest ranked media items can be presented 518. The scrolling can pertain to an incremental scroll or a page scroll depending upon implementation or mode of operation. Following the block 518, or following the decision 516 when a scroll input has not been received, a decision 520 determines whether a play request has been received. When the decision 520 determines that a play request has not been received, a decision 522 determines whether the search is to end. When the decision 522 determines that the search is not to end, the local search process 500 returns to repeat the decision 516 and subsequent blocks. Also, some of the matching media items are playable (e.g., track (song), music video, audiobook, podcast, movie, game) and other may not be playable (e.g., artist, album) and thus can require further navigation to reach a playable media item. Here, the play request is for the requested media item, which is deemed a playable media item.

Alternatively, when the decision 520 determines that a play request has been received, the requested media item is played 524. Here, the play request identifies the requested media item. While the requested media item is being played 524, a media play screen can be presented 526 on the display associated with the portable electronic device. The media play screen can display descriptive information pertaining to the requested media item, media content of the requested media item and/or one or more images associated with the requested media item. Still further, the media play screen can display a progress indication to visually indicate the extent to which the playback of the requested media item has been played (or remains to be played). Next, a decision 528 determines whether the playing of the requested media item has completed. When the decision 528 determines that the playing of the requested media has not completed, the local search process 500 waits until playback of the requested media item has completed. While waiting for the playback of the requested media item to complete, other processing 529 can optionally be performed. Depending on the requested media item being played 524, a single playable media item or a set of playable media items can be played. Alternatively, when the decision 528 determines that the playing of the requested media items has completed, the local search process 500 returns to repeat the block 514 and subsequent blocks, such that the search results are again presented to the user of the portable electronic device. For example, by previously saving the search results, the search results are able to be retrieved and re-presented. In other embodiments, when the playing of the requested media item has completed, the local search process 500 could return to display the search screen at block 504 or some other screen associated with the portable electronic device.

On the other hand, when the decision 522 determines that the search process should end, another screen is presented 530 on the display device of the portable electronic device. The other screen can be associated with any of the various tasks supported by the portable electronic device. Following the block 530, the local search process 500 ends.

As to the other processing 529, while playback of the requested media item is ongoing, the user can navigate from the media play screen (e.g., now playing screen) to the search screen or the search results screen. The user can then again search for matching media items or review matching media items as previously discussed. However, if the user does not interact with the portable electronic device for a predetermined period of time (e.g., 30 seconds), the local search process 500 can automatically transition back to the media play screen (e.g., now playing screen).

Figure 5C:
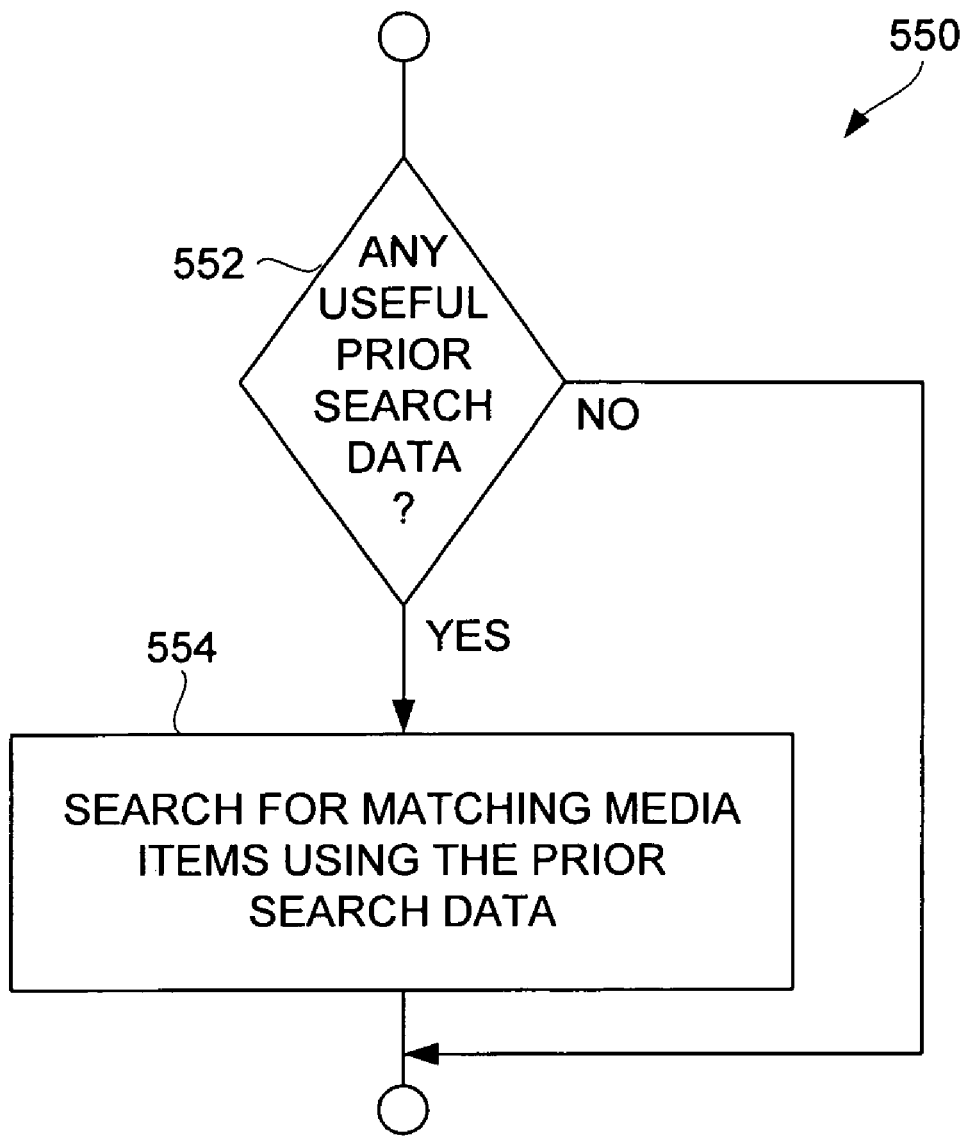
FIG. 5C is a flow diagram of a search enhancement process according to one embodiment of the invention.

FIG. 5C is a flow diagram of a search enhancement process 550 according to one embodiment of the invention. The search enhancement process 550 represents optional processing that can be performed at block 508 of the local search process 500 illustrated in FIG. 5A. The search enhancement process 550 enables the portable electronic device to potentially process a search request in a more efficient manner. The efficiency is advantageous in that the search results can be provided faster to the user and also in that computational power consumption is reduced.

The search enhancement process 550 begins with a decision 552 that determines whether any useful prior search data exists. When the decision 552 determines that there is no useful prior search data, then the search enhancement process 550 is not able to provide any enhancement to the search process. On the other hand, when the decision 552 determines that there is useful prior search data available, then the search enhancement process 550 searches 554 for the matching media items using the prior search data. In other words, when useful prior search data is available to the local search process 500, the search process can be performed using the prior search data in a more time and power efficient manner. However, when the prior search data is not available or not useful to the search being performed, the search process is performed without the benefit of the use of the prior search data.

In one embodiment, the prior search data can be determine to be useful by identifying a prefix from the current search request that matches the prior search data. For example, is the current search is for "hello" then prior search data for "h", "he" and "hel" are all useful. The largest match has the least number of matching media items so it is typically chosen for use. If the current search request has multiple words (e.g., "hel wor"), each can be separately considered.

The prior search data can be stored on the portable electronic device in a variety of different ways. Typically, the prior search data is stored on the portable electronic device in random access memory (RAM). Alternatively, the prior search data could be stored in a file resident within mass data storage, such as provided by Flash memory or a disc drive.

Figure 6A:
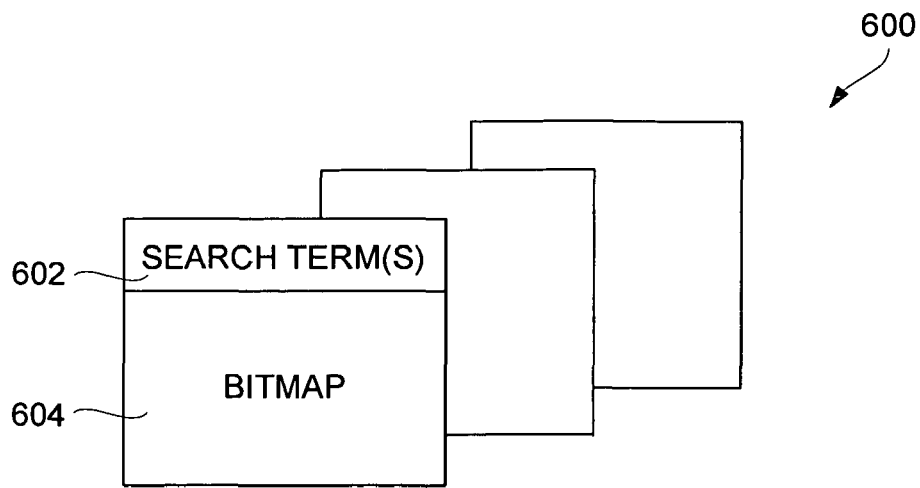
FIG. 6A illustrates a plurality of prior search data structures according to one embodiment of the invention.

FIG. 6A illustrates a plurality of prior search data structures 600 according to one embodiment of the invention. The prior search data structures 600 can be used to store prior search data on the portable electronic device. Each of the prior search data structures 600 stores one or more search terms 602 associated with the prior search as well as a bitmap 604. Each bit within the bitmap 604 corresponds to one of the media items stored locally at the portable electronic device. Each bit in the bitmap 604 provides an indication of whether or not the corresponding media item had a rank (i.e., matching score) that was significant. For example, in one embodiment, if the rank for a corresponding media item was zero (0), then the bitmap entry for a particular bit can be zero (0). On the other hand, if the rank was other than zero (0), the corresponding bit within the bitmap can be set to one (1). Hence, if there is relevant prior search data, such as when the current search term is a subset of a prior saved search term 602, then the search process can be efficiently performed by examining only those of the media items for which the corresponding bit is set in the bitmap 604.

Figure 6B:
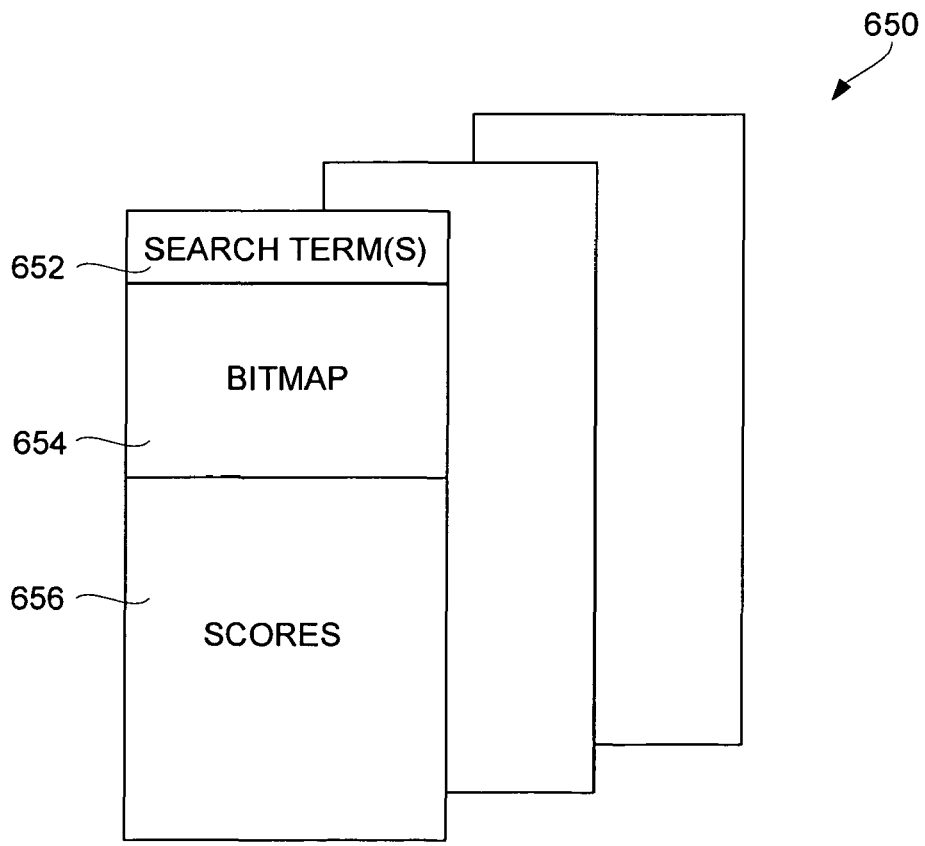
FIG. 6B illustrates a plurality of prior search data structures according to another embodiment of the invention.

FIG. 6B illustrates a plurality of prior search data structures 650 according to another embodiment of the invention. The prior search data structures 650 can be used to store prior search data on the portable electronic device. Each of the prior search data structures 650 stores one or more search terms 652 associated a prior search, a bitmap 654 providing correspondence between media items and search scores, and scores 656. Each bit within the bitmap 654 corresponds to one of the media items stored locally at the portable electronic device. Each bit in the bitmap 654 provides an indication of whether or not the corresponding media item had a rank (i.e., matching score) that was significant. The scores 656 stored within the prior search data structure 650 are those non-zero scores for those of the media items that had non-zero ranks. The bitmap 654 provides an indication of the corresponding ones of the media items for which the scores are being provided.

To limit memory consumption for prior search data, in one implementation, a predetermined number of the prior search data structures 600 and/or a predetermined number of the prior search data structures 650 can be stored on the portable electronic device. For example, the predetermined number could be five (5) prior search data structures 600 and five (5) prior search data structures 650.

As noted above, prior to presenting (e.g., displaying) matching media items in response to a search request, the matching media items can be ranked. The ranked media items can be presented in descending values of rank. In one embodiment, the ranking can be in accordance with a matching score provided as follows:

[1] Items that do not contain a search term is given a score of 0 points.
[2] If the (first) search term is found at the very start of the media item (i.e., "hel" matches "hello world"), the item is given a score of 10,000 points.
[3] Otherwise, if the search term is found at the very start of the media item (i.e., searching for "hel wor" and matching against "world wide web"), the item is given a score of 1,000 points.
[4] Otherwise, if a media item contains a search term, and the match is found at the start of any word in the media item (i.e., "wor" matches "hello world"), the media item is given a score of 100 points.
[5] Otherwise, if the media item contains a search term somewhere, the media item is given a score of 10 points.

The media item is said to "contain" a search term if it contains a sequence of characters that match the search term. Two characters can be deemed to match if they are exactly the same, or is different only in case ("E" matches "e"), or is an acceptable international character (i.e., "e" in an item matches "e" in the search term). Only alpha-numeric characters and the space character (considered as word break) are considered in the match, all other characters are treated as if they did not exist.

The final matching score of an item is the sum of the scores matching it to each search term. A score of zero (0) means that an item is excluded from search results. This means that "hel wor" will match both "hello" and "world", even though one or more search terms yielded a 0-score match. Put another way, the search terms have an "or" relationship, so that typing "hel wor" means is processes as looking for matches to "hel" or "wor" or both.

Alternatively, the matching score could be modified to give a higher score to an in-order match. For example, although not distinguished above, "hel wor" matching "hello world" could have a higher matching score than when matched against "world hello".

Figure 7:
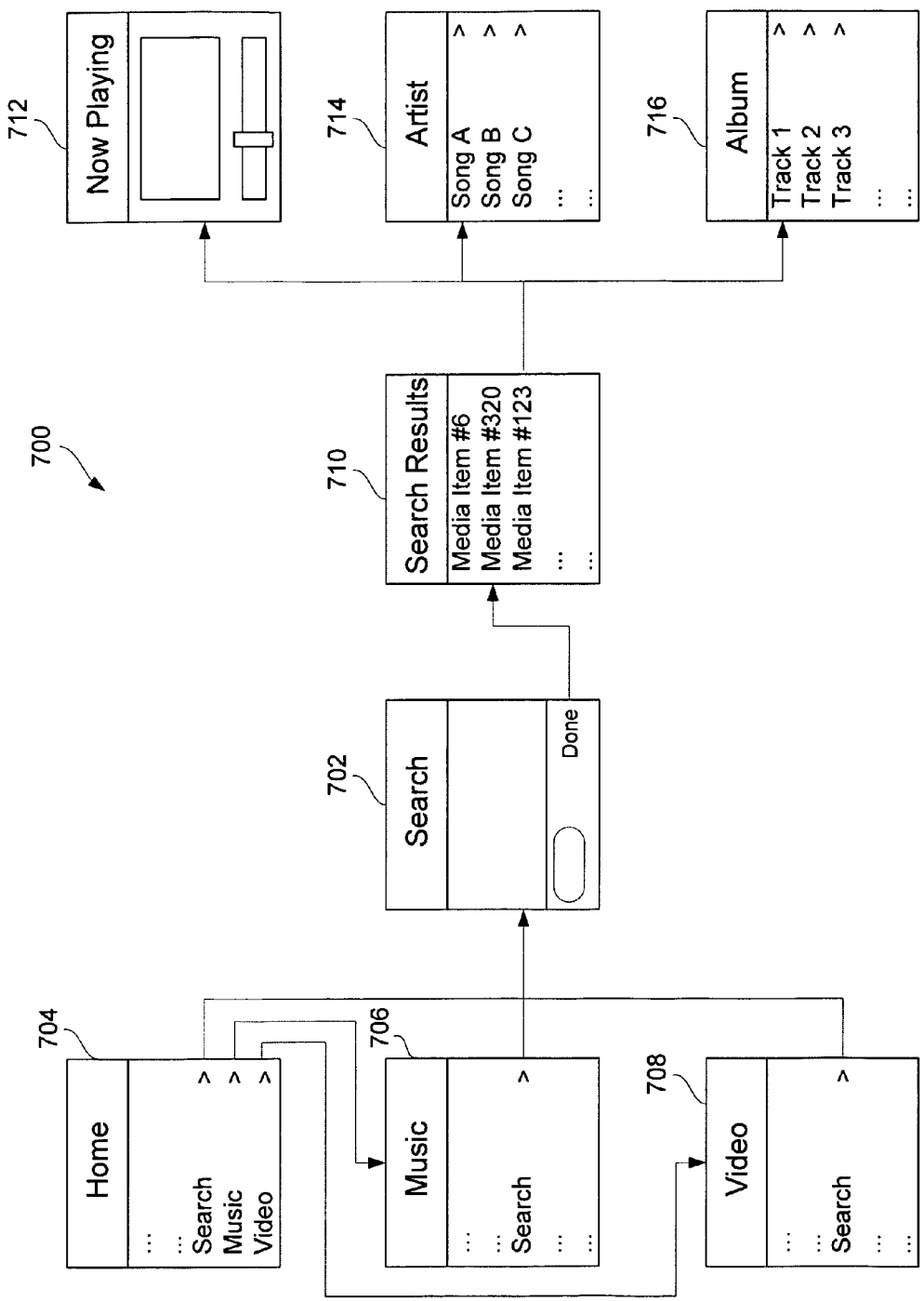
FIG. 7 is a diagram of a menu navigation arrangement according to one embodiment of the invention.

FIG. 7 is a diagram of a menu navigation arrangement 700 according to one embodiment of the invention. The menu navigation arrangement 700 illustrates navigation through a menu system having various different screens provided on a portable electronic device. Through use of menu navigation supported by the menu navigation arrangement 700, a user of the portable electronic device can navigate to a search screen 702 where a media item search can be performed. The user can navigate to the search screen 702 from a plurality of other screens. In particular, as illustrated in FIG. 7, the user can navigate to the search screen 702 from a home screen 704, a music screen 706 or a video screen 708. In this embodiment, each of the home screen 704, the music screen 706 and the video screen 708 include a "Search" menu item which can be selected by the user through interaction with a user input device of the portable electronic device. When the "Search" menu item is selected, the portable electronic device causes the search screen 702 to be displayed. In other words, upon selecting the "Search" menu item, the menu system transitions to display the search screen 702.

From the search screen 702, a user can interact with the portable electronic device to enter a search term including one or more characters. The search term is then used to search for media items stored on the portable electronic device that include the search term. After the search term has been completely entered, the user can signal the completion (e.g., by selecting "Done" or by some other user action) to the menu system so as to transition to a search results screen 710. The search results screen 710 displays the media items, namely, by displaying visual representations thereof, that were deemed to match the search term. Then, the user of the portable electronic device can select one of the matching media items that is displayed within the search results screen 710. In one embodiment, the media items within the search results screen 710 can pertain to a plurality of different media types, including albums, artists, songs, podcasts, video podcasts, and music videos. Hence, the menu screen next displayed following the selection of one of the matching media items within the search results screen 710 can be dependent upon the corresponding media type.

As illustrated in FIG. 7, the subsequent menu screen can pertain to a now playing screen 712, an artist screen 714 or an album screen 716. Although these menu screens all are particularly associated with music-based media items, other subsequent menu screens can be utilized to facilitate greater support for other types of media items. In any case, the now playing screen 712 can be presented on the portable electronic device when the selected matching media item is, for example, a song, video, audiobook or podcast that can be played. The artist screen 714 can be displayed on the portable electronic device when the selected matching media item pertains to an artist. The artist screen 714 can display a list of one or more songs associated with the artist. The album screen 716 can be displayed on the portable electronic device when the selected matching media item pertains to an album. The album screen 716 can display a list of one or more tracks associated with the album. When the now playing screen 712 is presented, after the playing of the media items has completed, the search results screen 710 can be automatically displayed. Also, from any of the now playing screen 712, the artist screen 714 or the album screen 716, a user action (e.g., menu button press) can cause the prior screen (e.g., the search results screen 710) to be presented again.

The menu navigation arrangement 700 illustrated in FIG. 7 can also be used with the graphical user interface described in U.S. Patent Publication No. 2004/0055446 A1 which is hereby incorporated by reference herein.

The search screen 702 illustrated in FIG. 7 can receive the search term in a single field search term entry region. Alternatively, a search term can be entered in one or more of a multiple number of field search term entry regions. The multiple fields can be optionally used to limit the search. For example, fields for artist name, album title and song title can be provided and entry of a search term into a particular field would search that term only in the corresponding area.

FIGS. 8A-8G are representative screens that can be displayed on a portable electronic device according to embodiments of the invention. These screens can represent implementation of some of the screens noted in the menu navigation arrangement 700 illustrated in FIG. 7.

Figure 8A:
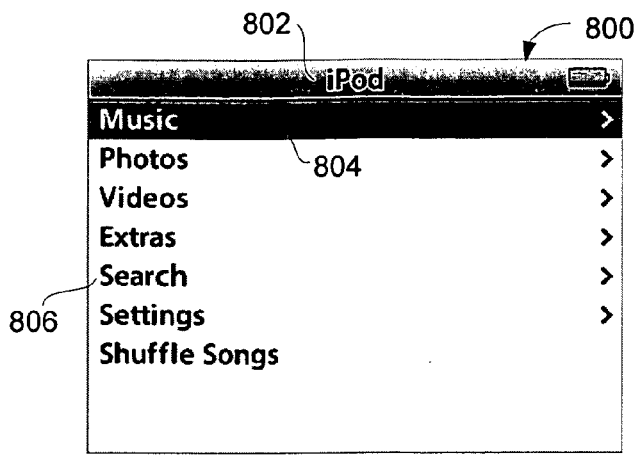
FIGS. 8A-8G are representative screens that can be displayed on a portable electronic device according to embodiments of the invention.

FIG. 8A is an exemplary home menu screen 800 according to one embodiment of the invention. The home menu screen 800 includes a title 802 and a movable highlight bar 804. The user of the portable electronic device can move the movable highlight bar 804 over any of the menu items provided within the home menu screen 800. One of the menu items provided in the home menu screen 800 is a "Search" item 806. Upon selection of the "Search" item 806, a search screen is presented on the portable electronic device.

In addition to having the "Search" item 806 within the home menu screen 800 as illustrated in FIG. 8A, the search menu item can be made available in other menus to facilitate searching from numerous different beginning points within the menu system. These different points in the hierarchy of the menu system can serve to limit (i.e., narrow) the searching to particular media types (e.g., depending on the context in the menu system). Alternatively, the system could permit entry of predetermined keywords or symbols to limit (i.e., narrow) a search. For example, a keyword "video" could signal to search only through those media items that are videos. As another example, a symbol "<" could be entered as "beatles <1965" to request searching for matching items containing "beatles" whose year is less than 1965. These predetermined keywords or symbols can be provided by physical keys or soft keys of or associated with a user input device.

Figure 8B:
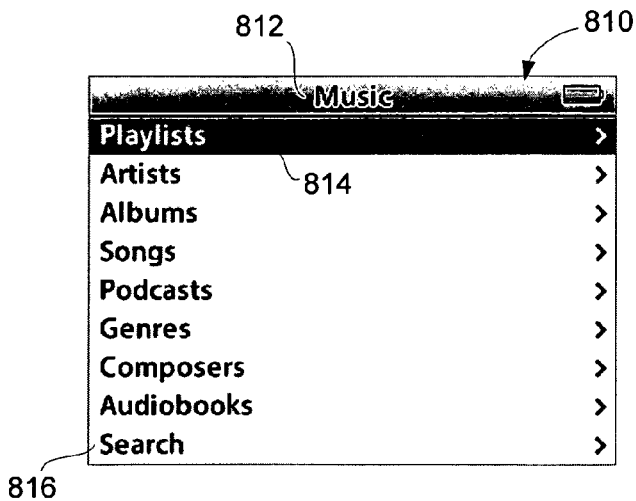

FIG. 8B is an example of a music menu screen 810 according to one embodiment of the invention. The music menu screen 810 includes a title 812 and a movable highlight bar 814. Within the music menu screen 810, a list of music related menu items are displayed. The user of the portable electronic device can select any of the menu items through use of the movable highlight bar 814. One of the menu items is a "Search" menu item 816. Upon selection of the "Search" menu item 816 with the movable highlight bar 814, a search screen is presented on the portable electronic device. Further, in one embodiment, when the "Search" menu item 816 from the music menu screen 810 is selected, any subsequent search function can be performed with result to only those media items that have a media type pertaining to music.

Figure 8C:
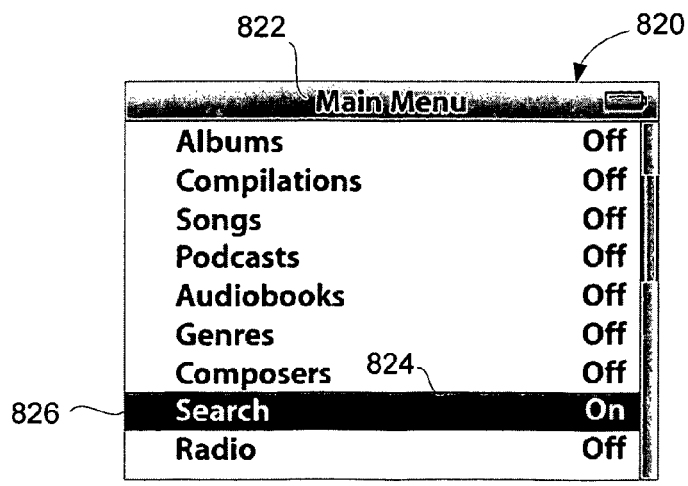

FIG. 8C is an exemplary main menu screen 820 according to one embodiment of the invention. The main menu screen 820 includes a title 822 and a movable highlight bar 824. As illustrated in FIG. 8C, the movable highlight bar 824 has been positioned over a "Search" menu item 826. A user can then select the "Search" menu item 826 to turn-on/turn-off (toggle) whether a search screen is available from a home menu screen (e.g., FIG. 8A) on the portable electronic device.

Figure 8D:
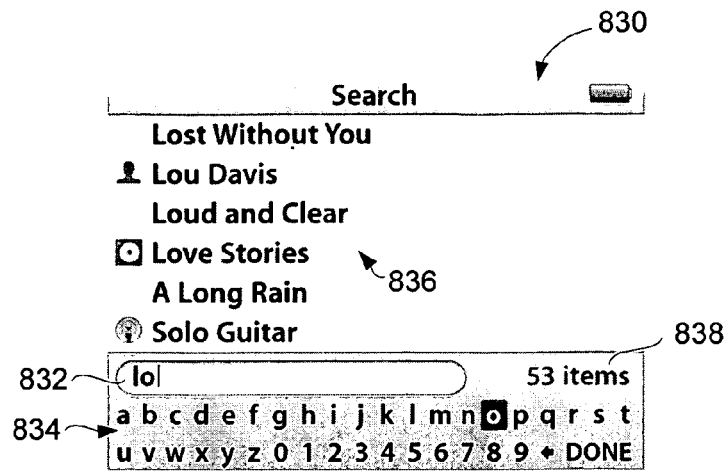

FIG. 8D is an exemplary search screen 830 according to one embodiment of the invention. The search screen 830 includes a text field 832 and a character selection area 834. The user can interact with the user input device of the portable electronic device to select any of the characters within the character selection area 834. Upon selection of a character, the character appears in the text field 832. The one or more characters entered into the text field 832 form a search term that is utilized by the portable electronic device to search its data storage for media items that match the search term. As illustrated in FIG. 8D, the characters available for selection include A-Z, backspace or Done. If the portable electronic device includes a rotational input device, that character to be entered can be navigated to by a rotational user input. A press and hold of button regions (e.g., button-action regions 158 and 160) can respectively initiate a space input or deletion of a last input character. In one embodiment, as the characters are selected and placed in the text field 832, the portable electronic device performs a search operation to locate those media items having the search term. In the example illustrated in FIG. 8D, the text field 832 contains the search term "lo" and thus the portable electronic device searches for those media items that include the search term "lo". The search screen 830 includes a list 836 of media items that match the search term. Although only a portion of the list 836 is often visible in the search screen 830, a result count 838 can be provided to specify the number of media items that match the search term. Hence, as the characters are selected and placed in the text field 832, the search is performed and the list 836 formed and displayed. Given that the media items in the list 836 are ranked, their position within the list 836 can change as the list 836 is being formed. Hence, the display of the portion of the list 836 in the search screen 830 can be periodically updated so that results can be rapidly displayed without excessive order shuffling of the media items in the list 836.

When the user is done entering characters into the text field 832, the user can navigate within the character selection area 834 to the "Done" character. Upon selection of the "Done" character, the menu system transitions to a search results screen. Alternatively, the user can clear any entered characters by a predetermined user input action, such as a button press action (e.g., button-action region 160).

Figure 8E:
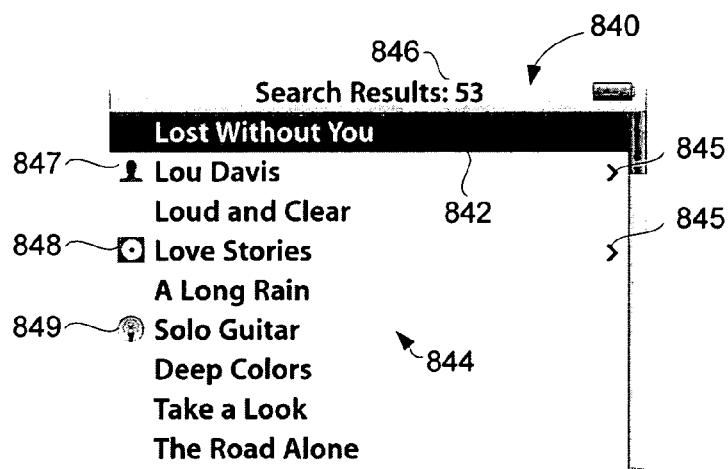

FIG. 8E is an exemplary search results screen 840 according to one embodiment of the invention. The search results screen 840 includes a movable highlight bar 842 that can be used by the user to select any one of the media items within a list 844 of matching media items being presented in the search results screen 840. A result count 846 can also be displayed in the search results screen 840 to specify the number of media items that match the search term. To the extent that the number of media items in the list 844 is beyond the number that can be displayed within the search results screen 840, the user is able to scroll through the list 844. In one embodiment, one or more of the media items within the list 844 can be visually indicated as to their type of media item. For example, as illustrated in FIG. 8E, graphical indicators (e.g., icons) 847, 848 and 849 are illustrated as corresponding to certain of the media items in the list 844. The icon 847 can specify that the corresponding media item is an artist. The icon 848 can indicate that the corresponding media item is an album or compact disc (CD). The icon 849 can indicate that the corresponding media item is a podcast. Another visual indicator 845 (e.g., ">") can indicate that more screens follow. On the other hand, those without the other visual indicator 845 can be played upon being selected.

Also, for enhanced user experience, the list 844 is periodically updated to prevent excessive order shuffling when the search results screen 840 is displayed before the underlying search has completed. Moreover, when the underlying search is still processing if the user is actively moving through the list 844, the list 844 is not updated with new search results until after the activity has ceased (e.g., updated after a predetermined period of inactivity). Further, if the user has actively highlighted an item in the list 844, when updating the list 844 with additional search results, the displayed position of the highlighted item is preserved (i.e., not moved on-screen).

Figure 8F:
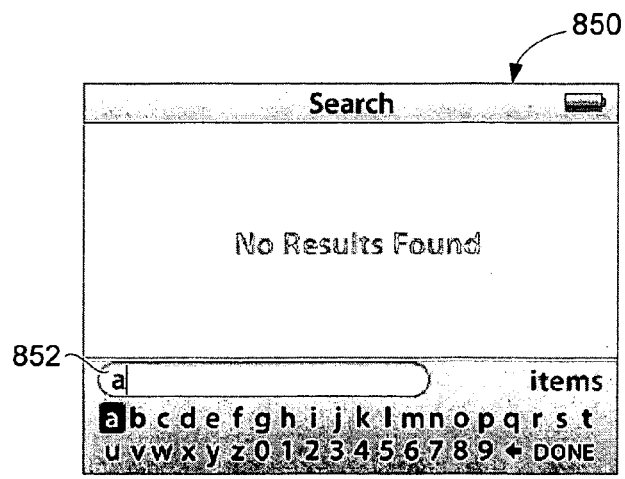

FIG. 8F is an exemplary search screen 850 according to one embodiment of the invention. The search screen 850 includes a text field 852. As illustrated in FIG. 8F, the text field 852 includes a single character "a". In this example, the single character represents the search term at this point in time. However, in this example, the portable electronic device has been searched for any media items that include the character "a" and found no matching media items were found. As a result, the search screen 850 does not display a list of media items but, instead, notifies the user that no matching results were found to match the search term.

Figure 8G:
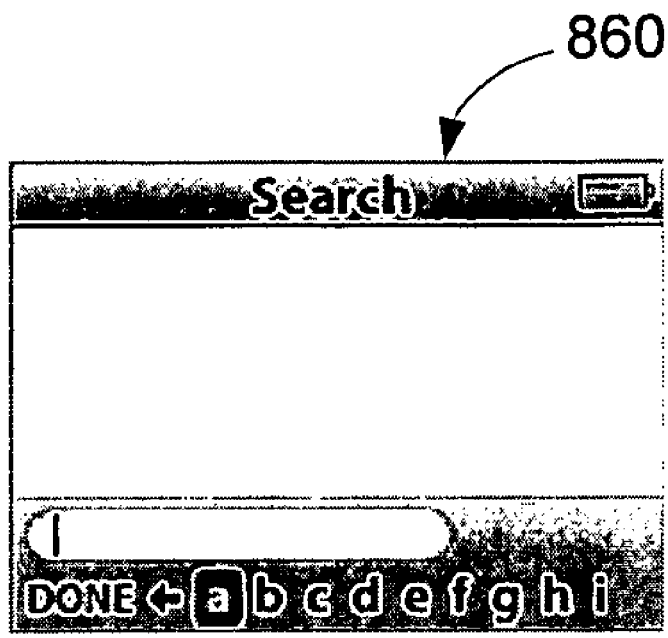

FIG. 8G is an exemplary search screen 860 according to one embodiment of the invention. The search screen 860 is generally similar to the search screen 830 illustrated in FIG. 8D except that the character selection area is smaller. Although not all the available characters are shown in the character selection area of the search screen 860, they can be displayed by scrolling through the characters. The search screen 860 is suitable for use on smaller display devices.

A menu is one form of a list. A list is more generally a data set. A data set pertains to a set of data. As one example, the data set can be a list of items (e.g., a list of songs). As another example, the data set can be a media file (e.g., MP3 or other audio file, video file, or image file). In one embodiment, the data set can be considered an ordered data set because the data within the set is often ordered. For example, the songs in a list are arranged alphabetically. Besides an alphabetical order, various other ordering methods can be used. For example, a data set (e.g., list) can be ordered by a rating, a genre, an album, an artist, duration, date, etc.

U.S. Patent Publication No. 2003/0076301 A1 is hereby incorporated by reference herein. U.S. Patent Publication No. 2003/0095096 A1 is hereby incorporated by reference herein. U.S. Patent Publication No. 2003/0055446 A1 is hereby incorporated by reference herein. U.S. Pat. No. 7,046,230 B2 is hereby incorporated by reference herein. U.S. Pat. No. 7,084,856 B2 is hereby incorporated by reference herein.

Although the invention is discussed above in the content of searching media items, the invention is, more generally, applicable to searching digital data. Digital data can include not only media items but also non-media items, such as notes, contacts, calendar, appointments, etc.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, memory cards, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. It should be noted that this is not an exhaustive list of advantages and there may be other advantages which are not described herein. One advantage of the invention is that a user of portable electronic device can provide search capabilities to assist its user in locating particular media items. Another advantage of the invention is that a user is able to easily and rapidly enter a text input to be used in searching for media items. Another advantage of the invention is that a multitude of different types of media items can be searched separately or together on a portable electronic device. Still another embodiment of the invention causes the matching media items to be displayed in accordance with a ranking. Yet still another advantage of the invention is that a search screen and a search result screen can be provided to facilitate input of search text and display of matching media items.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. In a portable electronic device that includes a display, a media storage device and a user input device, and is operable to present media items each having associated metadata, a method for searching media items stored on the portable electronic device the method comprising:
   activating a search function;
   presenting a search window in accordance with the activated search function, the search window including a text box;
   receiving, by the portable electronic device, a character string at the text box;
   searching, by the portable electronic device, media items stored in the media storage by comparing the character string to at least a portion of the metadata of the media items to identify those media items that match at least a portion of the character string, wherein the metadata uniquely identifies each of the media items and is stored on the portable electronic device;
   generating, by the portable electronic device, for all of the media items stored locally, a bitmap wherein each bit in the bitmap corresponds to one of the media items stored locally at the portable electronic device and provides an indication of whether or not the media item matched at least the portion of the received character string;
   displaying, by the portable electronic device, at least a subset of the identified media items that match the portion of the character string;
   receiving, by the portable electronic device, a second character string at the text box;
   based upon the second character string and the character string, determining that the bitmap is relevant to a search using the second character string; and
   searching, by the portable electronic, including examining according to the second character string the metadata of only the media items whose bit in the bitmap indicates the media item matched at least the portion of the received character string.

2. A method as recited in claim 1, wherein the method further comprises:
   receiving a selection of one of the identified media items; and
   subsequently presenting the selected media item.

3. A method as recited in claim 2, wherein the presenting comprises displaying media content corresponding to the selected media item.

4. A method as recited in claim 2, wherein the presenting comprises playing media content corresponding to the selected media item.

5. A method as recited in claim 1, wherein the user input device comprises a rotational user input device.

6. A method as recited in claim 5, wherein the user applies a rotational action to the rotational user input device to identify each character of the character string to be input.

7. A method as recited in claim 1, wherein the operation of the search function is dependent on the one of the different screens from which the menu choice was selected to activate the search function.

8. A method as recited in claim 1, wherein the method further comprises:
   storing search data following the searching; and
   subsequently utilizing the stored search data to process other related character string.

9. A method as recited in claim 1, wherein the method further comprises:
   storing search data following the searching; and
   subsequently utilizing the stored search data to re-display at least a subset of those of the identified media items that match the character string.

10. The method of claim 1, wherein the bit in the bitmap is set to zero for a particular media item when there is no match to at least the portion of the received character string.

11. In a portable electronic device that includes a display, a media storage device and a user input device, and is operable to present media items each having associated metadata, a method for searching media items stored on the portable electronic device, the method comprising:
   receiving a navigation command indicating a selection of a particular category of a hierarchical organization of media items;
   navigating to a screen corresponding to the particular category, wherein the screen has menu items including a search function;
   displaying, by the portable electronic device, a search screen on the display;
   receiving, by the portable electronic device, a single search character input for at least a portion of a search term from the user input device;
   searching, by the portable electronic device, for one or more media items of all categories stored in the media storage that match the one or more search characters, wherein the searching is associated with a search function and involves comparing the search characters with metadata stored on the portable electronic device uniquely identifying each of the media items;
   generating, by the portable electronic device, for the media items stored locally, a bitmap wherein each bit in the bitmap corresponds to one of the media items stored locally at the portable electronic device and provides an indication of whether or not the media item matched the one or more search characters;

ranking, by the portable electronic device, the one or more matching media items;

displaying, by the portable electronic device, in accordance with the ranking, at least a subset of those of the matching media items;

receiving, by the portable electronic device, a second character string from the user input device;

based upon the second character string and the one or more search characters, determining that the bitmap is relevant to a search using the second character string; and searching, by the portable electronic, including examining according to the second character string the metadata of only the media items whose bit in the bitmap indicates the media item matched the one or more search characters.

12. A method as recited in claim 11, wherein the method further comprises:

determining whether all the search characters for the search term have been received; and displaying a search results screen on the display after the determining determines that all the one or more search characters for the search term have been received.

13. A method as recited in claim 12, wherein the search results screen includes a listing of at least a subset of the matching media items.

14. A method as recited in claim 12, wherein the method further comprises:

receiving a play request to play one of the matching media items;

playing the requested one of the matching media items; and displaying a media play screen while the requested one of the matching media items is being played.

15. A method as recited in claim 14, wherein the method further comprises:

determining whether the requested one of the matching media items has completed playing; and re-displaying the search results screen on the display after the determining determines that the requested one of the matching media items has completed playing.

16. A method as recited in claim 14, wherein the method further comprises:

subsequently determining whether the search screen is to be displayed instead of the media play screen while the requested one of the matching media items is being played; and re-displaying the search screen on the display after the determining determines that the search screen is to be displayed instead of the media play screen while the requested one of the matching media items is being played.

17. A method as recited in claim 16, wherein the method further comprises:

thereafter automatically re-displaying the media play screen instead of the search screen after a predetermined period of inactivity with respect to the search screen.

18. A method as recited in claim 11, wherein the user input device comprises a rotational user input device.

19. A method as recited in claim 18, wherein the user applies a rotational action to the rotational user input device to input each character of the character string.

20. A method as recited in claim 11, wherein the portable electronic device is a battery-powered, media player.

21. A computer readable medium storing at least executable computer program code for searching digital data items having associated metadata stored as digital data on a portable electronic device, where the portable electronic device includes a display, a data storage device and a user input device, and is operable to present the digital data items, the computer readable medium comprising:

executable computer program code for activating a search function executable computer program code for presenting a search window in accordance with the activated search function, the search window including a text box;

executable computer program code for receiving, by the portable electronic device, a character string at the text box;

executable computer program code for searching, by the portable electronic device, digital data items stored in the media storage device by comparing the character string to at least a portion of the metadata of the digital data items to identify those of the digital data items that match at least a portion of the character string, wherein the metadata uniquely identifies each of the digital data items and is stored on the portable electronic device;

executable program code for generating, by the portable electronic device, for the digital data items stored locally, a bitmap wherein each bit in the bitmap corresponds to one of the digital data items stored locally at the portable electronic device and provides an indication of whether or not the media item matched at least the portion of the received character string;

executable computer program code for displaying, by the portable electronic device, at least a subset of those of the identified digital data items that match the character string executable program code for receiving, by the portable electronic device, a second character string at the text box;

executable program code, based upon the second character string and the character string, for determining that the bitmap is relevant to a search using the second character string; and executable program code for searching, by the portable electronic, including examining according to the second character string the metadata of only the digital data items whose bit in the bitmap indicates the media item matched at least the portion of the received character string.

22. A computer readable medium as recited in claim 21, wherein the user input device comprises a rotational user input device, and wherein the computer program code for receiving a character string from the user input device comprises computer program code for receiving a rotational action with respect to the rotational user input device to identify at least one character of the character string.

23. A portable media playback device, comprising:
a display device;
a user input device,
at least one memory device capable of storing a plurality of media items each having metadata and executable computer program code for displaying, navigating, playing, or searching the plurality of media items; and
a processing device operatively connected to the display device, the user input device and the at least one memory device, wherein the portable media playback device is further operable to:

receive at least one search character input for at least a portion of a search term from the user input device;

search for one or more media items stored in the media storage that match the one or more search characters by comparing the search characters with metadata stored on the user input device uniquely identifying each of the media items;

generate a bitmap for the media items stored locally wherein each bit in the bitmap corresponds to one of the media items stored locally in the media storage and provides an indication of whether or not the media item matched the one or more search characters;

display at least a subset of those of the matching media items on the display device in accordance with a ranking;

receiving a second character string via the input device;

based upon the second character string and the one or more search characters, determine that the bitmap is relevant to a search using the second character string; and search including examining according to the second character string the metadata of only the media items whose bit in the bitmap indicates the media item matched the one or more search characters.

24. A portable media playback device as recited in claim 23, wherein the executable computer program code for displaying, navigating, playing, or searching the plurality of media items further comprises:

executable computer program code for displaying a search screen on the display device to assist with receiving of the at least one search character.

25. A portable media playback device as recited in claim 24, wherein the executable computer program code for displaying at least a subset of those of the matching media items on the display device in accordance with the ranking comprises:

executable computer program code for displaying a search results screen on the display device.

26. A portable media playback device as recited in claim 23, wherein the user input device is a rotational input device capable of receiving a rotational user input.

27. A portable media playback device as recited in claim 23, wherein the media playback device is a battery-powered, handheld media playback device.

28. In a portable electronic device that includes a display having a limited size unable to display a list of a significant number of media items simultaneously, a media storage device and a user input device, and is operable to present media items each having associated metadata, a method for searching media items stored on the portable electronic device, the method comprising:

displaying, by the portable electronic device, a search screen on the display;

receiving, by the portable electronic device, a single search character input for at least a portion of a search term from the user input device;

searching, by the portable electronic device, for one or more media items categories stored in the media storage that match the one or more search characters, wherein the searching is associated with a search function and involves comparing the search characters with metadata stored on the portable electronic device uniquely identifying each of the media items;

generating, by the portable electronic device, for the media items stored locally, a bitmap wherein each bit in the bitmap corresponds to one of the media items stored locally at the portable electronic device and provides an indication of whether or not the media item matched the one or more search characters;

ranking, by the portable electronic device, the one or more matching media items; and displaying, by the portable electronic device, in the search screen, in accordance with the ranking, at least a subset of those of the matching media items;

receiving a selection of one of the matching media items displayed in the search screen;

playing the selected one of the matching media items;

receiving, by the portable electronic device, a second character string from the user input device;

based upon the second character string and the one or more search characters, determining that the bitmap is relevant to a search using the second character string; and searching, by the portable electronic, including examining according to the second character string the metadata of only the media items whose bit in the bitmap indicates the media item matched the one or more search characters.

29. A method as recited in claim 28, wherein the method further comprises:

determining whether the requested one of the matching media items has completed playing; and re-displaying the search results screen on the display after the determining determines that the requested one of the matching media items has completed playing.

30. A method as recited in claim 28, wherein the method further comprises:

subsequently determining whether the search screen is to be displayed instead of the media play screen while the requested one of the matching media items is being played; and re-displaying the search screen on the display after the determining determines that the search screen is to be displayed instead of the media play screen while the requested one of the matching media items is being played.

31. A method as recited in claim 30, wherein the method further comprises:

thereafter automatically re-displaying the media play screen instead of the search screen after a predetermined period of inactivity with respect to the search screen.

\* \* \* \* \*

UNITED STATES PATENT AND TRADEMARK OFFICE
CERTIFICATE OF CORRECTION

PATENT NO. : 8,341,524 B2
APPLICATION NO. : 11/519352
DATED : December 25, 2012
INVENTOR(S) : Gupta et al.

It is certified that error appears in the above-identified patent and that said Letters Patent is hereby corrected as shown below:

On the title page item 56

On page 4, in column 1, under "Foreign Patent Documents", line 14, delete "WO2004" and insert --WO 2004--, therefor On page 4, in column 1, under "Other Publications", line 6, after "2004", insert --,--, therefor On page 4, in column 1, under "Other Publications", line 15, after "Search", insert --International--, therefor On page 4, in column 2, under "Other Publications", line 4, delete "Guy." and insert --Guy,--, therefor On page 4, in column 2, under "Other Publications", line 15, delete "2.0"/MP3" and insert --2.0", MP3--, therefor On page 4, in column 2, under "Other Publications", line 31, before ""Digital", insert --Mimi, Chakarova et al.,--, therefor On page 4, in column 2, under "Other Publications", line 31-32, after "Computer,"", delete "Mimi Chakarova et al.,", therefor On page 4, in column 2, under "Other Publications", line 64, after ".asp", insert --,--, therefor On page 4, in column 2, under "Other Publications", line 71, delete "www2." and insert --www--, therefor On page 5, in column 1, under "Other Publications", line 10, delete "Matz,"," and insert --Matz,"--, therefor Signed and Sealed this
Sixth Day of October, 2015

Michelle K. Lee
*Director of the United States Patent and Trademark Office*

CERTIFICATE OF CORRECTION (continued)
U.S. Pat. No. 8,341,524 B2

On the title page item 56

On page 5, in column 1, under "Other Publications", line 65, delete ""Straßenmusik" and insert --"Strapenmusik--, therefor On page 5, in column 2, under "Other Publications", line 3, delete "Wadali" and insert --Wadali,--, therefor On page 5, in column 2, under "Other Publications", line 7, delete "Alexander." and insert --Alexander,--, therefor On page 5, in column 2, under "Other Publications", line 14, delete "Karen." and insert --Karen,--, therefor On page 5, in column 2, under "Other Publications", line 40, delete "from" and insert --in--, therefor On page 5, in column 2, under "Other Publications", line 45, before "Search", insert --International--, therefor On page 5, in column 2, under "Other Publications", line 54, delete "from" and insert --in--, therefor On page 5, in column 2, under "Other Publications", line 72, delete "2009, in" and insert --2009 in--, therefor On page 6, in column 2, under "Other Publications", line 2, delete "from" and insert --in--, therefor On page 6, in column 2, under "Other Publications", line 9, delete "5," and insert --5--, therefor

In the claims

In column 16, line 1, in Claim 1, after "electronic", insert --device--, therefor In column 18, line 6, in Claim 21, after "function", insert --;--, therefor In column 18, line 31, in Claim 21, after "string", insert --;--, therefor In column 18, line 40, in Claim 21, after "electronic", insert --device--, therefor In column 19, line 54, in Claim 28, after "item", delete "categories", therefor In column 20, line 25, in Claim 28, after "electronic", insert --device--, therefor